US012118813B2

(12) United States Patent
Semenov

(10) Patent No.: US 12,118,813 B2
(45) Date of Patent: Oct. 15, 2024

(54) CONTINUOUS LEARNING FOR DOCUMENT PROCESSING AND ANALYSIS

(71) Applicant: ABBYY Development Inc., Dover, DE (US)

(72) Inventor: Stanislav Semenov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 447 days.

(21) Appl. No.: 17/518,191

(22) Filed: Nov. 3, 2021

(65) Prior Publication Data

US 2023/0138491 A1    May 4, 2023

(30) Foreign Application Priority Data

Nov. 3, 2021 (RU) ................................ 2021132196

(51) Int. Cl.
*G06V 30/41*        (2022.01)
*G06F 40/174*     (2020.01)
(Continued)

(52) U.S. Cl.
CPC ............ *G06V 30/41* (2022.01); *G06F 40/174* (2020.01); *G06N 3/048* (2023.01); *G06N 3/08* (2013.01); *G06V 30/153* (2022.01)

(58) Field of Classification Search
CPC .................. G06V 30/41; G06V 30/153; G06V 30/19127; G06V 30/19107;
(Continued)

(56) References Cited

U.S. PATENT DOCUMENTS 10,510,000 B1   12/2019   Commons
10,521,878 B1 *   12/2019   Medina, III ......... G06V 30/416
(Continued)

FOREIGN PATENT DOCUMENTS

CN        110196864 A    9/2019
DE    102008027605 B4    1/2010
(Continued)

OTHER PUBLICATIONS

Belaïd, Abdel, et al., "Administrative Document Analysis and Structure", https://hal.inria.fr/inria-00579833, Mar. 25, 2011, 22 pages.
(Continued)

*Primary Examiner* — Molly Wilburn
(74) *Attorney, Agent, or Firm* — Lowenstein Sandler LLP

(57) ABSTRACT

A document processing method includes receiving one or more documents, performing optical character recognition on the one or more documents to detect words comprising symbols in the one or more documents, and determining a encoding value for each of the symbols. It further includes applying a first hash function to each encoding value to generate a first set of hashed symbol values, applying a second hash function to each hashed symbol value to generate a vector array including a second set of hashed symbol values, and applying a linear transformation to each value of the second set of hashed symbol values of the vector array. The method also includes applying an irreversible non-linear activation function to the vector array to obtain abstract values associated with the symbols and saving the abstract values to train a neural network to detect fields in an input document.

20 Claims, 10 Drawing Sheets

(51) Int. Cl.
  *G06N 3/048* (2023.01)
  *G06N 3/08* (2023.01)
  *G06V 30/148* (2022.01)
(58) Field of Classification Search
  CPC ............ G06V 30/19173; G06V 30/416; G06F 40/174; G06F 40/103; G06N 3/048; G06N 3/08; G06N 3/084; G06N 3/045
  See application file for complete search history.

(56) References Cited

U.S. PATENT DOCUMENTS

| | | |
|---|---|---|
| 11,366,434 B2 | 6/2022 | Abeloe |
| 2003/0101187 A1 | 5/2003 | Gaussier et al. |
| 2011/0093464 A1 | 4/2011 | Cvet et al. |
| 2017/0357896 A1 | 12/2017 | Tsatsin et al. |
| 2019/0052467 A1* | 2/2019 | Bettger .................. H04L 9/088 |
| 2019/0266231 A1 | 8/2019 | Govindappa |
| 2019/0266354 A1 | 8/2019 | Banerjee et al. |
| 2019/0279011 A1 | 9/2019 | Kshirsagar et al. |
| 2019/0347328 A1 | 11/2019 | Rush et al. |
| 2019/0362020 A1 | 11/2019 | Paulus et al. |

FOREIGN PATENT DOCUMENTS

| | | |
|---|---|---|
| JP | 2019526851 A | 9/2019 |
| RU | 2556425 C1 | 7/2015 |
| WO | 2018142266 A1 | 8/2018 |
| WO | 2019086553 A1 | 5/2019 |

OTHER PUBLICATIONS

Holt, Xavier Holt, SYPHT, Andrew Chisholm, "Extracting structured data from invoices", 2 pages, [retrieved from the internet on Nov. 3, 2021].

Ivaschenko A., et al., "Hybridization of Intelligent Solutions Architecture for Text Understanding and Text Generation," Applied Sciences, Jun. 2, 2021, vol. 11, 5179, Retrieved from URL: https://doi.org/10.3390/ U.S. Appl. No. 11/115,179.

* cited by examiner

CONTINUOUS LEARNING FOR DOCUMENT PROCESSING AND ANALYSIS

RELATED APPLICATIONS

This application claims the benefit of priority under 35 USC 119 to Russian patent application No. RU2021132196, filed on Nov. 3, 2021.

TECHNICAL FIELD

The implementations of the disclosure relate generally to computer systems and, more specifically, to systems and methods for document processing and analysis.

BACKGROUND

Training machine learning models for detecting elements in unstructured electronic documents is a foundational task involved in automated processing, storing, and referencing documents. Some approaches for field detection may involve the use of a large number of predetermined categories and/or classification rules or a large number of user labeled documents and may thus require many human operations.

SUMMARY OF THE DISCLOSURE

Implementations of the present disclosure describe mechanisms and methods for training and processing documents with machine learning models.

A method of the disclosure includes receiving, by a processing device, one or more documents, performing optical character recognition on the one or more documents to detect words comprising symbols in the one or more documents, and determining a encoding value for each of the symbols. It further includes applying a first hash function to each encoding value to generate a first set of hashed symbol values, applying a second hash function to each hashed symbol value to generate a vector array including a second set of hashed symbol values, and applying a linear transformation to each value of the second set of hashed symbol values of the vector array. The method also includes applying an irreversible non-linear activation function to the vector array to obtain abstract values associated with the symbols and saving the abstract values to train a neural network to detect fields in an input document.

A system of the disclosure includes a memory, and a processor coupled to the memory, where the processor is configured to receive one or more documents, to perform optical character recognition on the one or more documents to detect words including symbols in the one or more documents, and to determine a Unicode value for each of the symbols. It is also configured to apply a first hash function to each Unicode value to generate a first set of hashed symbol values, apply a second hash function to each hashed symbol value of the first set of hashed symbol values to generate a vector array comprising a second set of hashed symbol values, and apply a linear transformation to each value of the second set of hashed symbol values of the vector array. The processor is further configured to apply an irreversible non-linear activation function to the vector array to obtain abstract values associated with the symbols, and to save the abstract values to train a neural network to detect fields in an input document. The processor can also be configured to receive train a neural network to detect fields in the input document using the saved abstract values.

A non-transitory machine-readable storage medium of the disclosure includes instructions that, when accessed by a processing device, cause the processing device to receive one or more documents, to perform optical character recognition on the one or more documents to detect words including symbols in the one or more documents, and to determine a Unicode value for each of the symbols. The instructions can also cause the processing device to apply a first hash function to each Unicode value to generate a first set of hashed symbol values, apply a second hash function to each hashed symbol value of the first set of hashed symbol values to generate a vector array comprising a second set of hashed symbol values, and apply a linear transformation to each value of the second set of hashed symbol values of the vector array. The instructions can further cause the processing device to apply an irreversible non-linear activation function to the vector array to obtain abstract values associated with the symbols, and to save the abstract values to train a neural network to detect fields in an input document.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
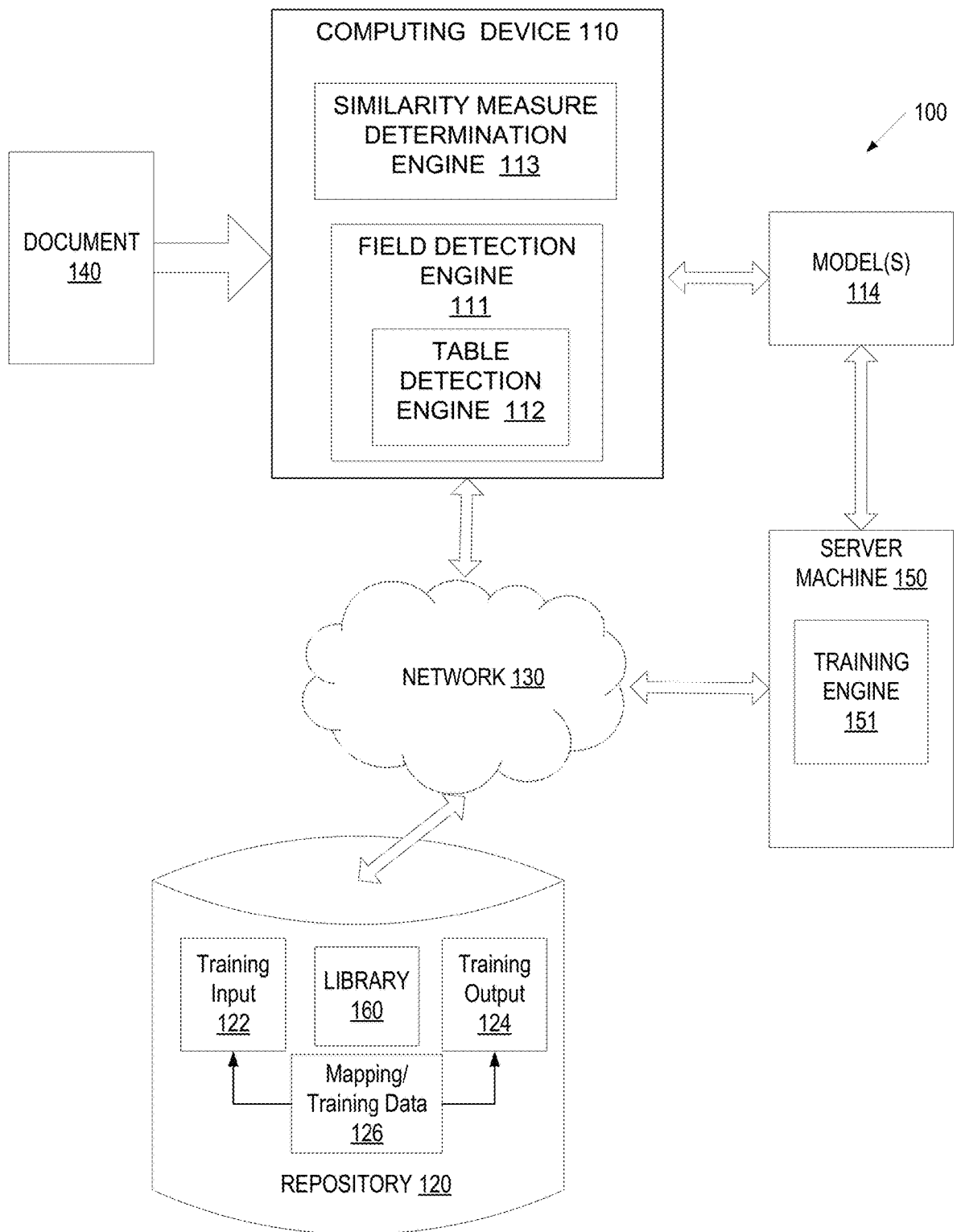
FIG. 1 is a high level component diagram of an of an illustrative system architecture in accordance with an implementation of the present disclosure.

Implementations for continuous learning for document process and analysis are described. More specifically, implementations disclosed herein relate to training machine learning models for processing documents and include multifunctional trainable models processing unstructured documents with the goal of detecting and subsequent extraction of particular information from them using neural network approaches.

Some approaches for processing documents use trainable neural networks. However, these approaches may necessitate having large sets of specific documents (e.g., several thousand company bills, invoices, bank statements, business cards, ID cards, credit applications, etc. which can include confidential information). In other cases, systems trained on sets of various types of documents may not be able to detect fields with a sufficiently high level of accuracy because the documents can be substantially different from one another. These types of systems may need extensive additional training. Furthermore, selection of sets of documents for additional training of such systems may require accurate markup of each of the documents, which may result in an expensive and time consuming endeavor rife with risks of potential disclosure of confidential information.

As used herein, documents can include items of different types, e.g., invoices, identification documents (IDs), credit applications, bank statements, contracts, multipage documents, bills of lading, tickets, accounting documents, statements, etc. that a user may need to possess in large numbers in physical or digital form. Furthermore, "electronic document" (also referred to simply as "document" herein) may refer to any document, an image of which may be accessible to a computing system. The image may be a scanned image, a photographed image, or any other representation of a document that is capable of being converted into a digital form accessible to a computer. For example, "electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc. Although the document may be represented in an electronic (e.g., digital) file format, in some cases it can be presumed that the document is not electronically structured and that the document layout—locations of various text fields, tables, etc.—is not specified in the electronic file. (As, for example, would be the case if the document were originally issued in an electronic format—an e-invoice or other similar electronic documents—with the locations of the fields and tables already specified.)

A "document" may be structured or unstructured and may represent a financial document, a legal document, or any other document, e.g., a document that is produced by populating fields with alphanumeric symbols (e.g., letters, words, numerals) or images. "Document" may represent a document that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on. Examples of different types of documents that have fields include contracts, invoices, financial documents, business cards, personal identification documents, loan applications, order/discharge documents, accounting documents, reporting documents, patent search reports, various company forms, etc.

As used herein, "field" may refer to a data area in a document that contains alphanumeric characters. A "table" may refer to any graphical structure, e.g. a structure formed by lines. The lines may define a plurality of rows (e.g., when lines are horizontal), a plurality of columns (e.g., when lines are vertical), or a plurality of cells (e.g., defined by vertical and horizontal lines, if both are present in a document). The disclosed implementations may also be applied to documents that include tables defined by oblique lines. Such instances may occur as a result of a document design or because of a misalignment that happens during imaging of the document. A table may include cells containing other fields, such as any fields populated with alphanumeric characters, and/or fields that contain images (such as logos), etc.

As used herein, "field type" may refer to a type of content included in a filed. For example, a text field type may be "name," "company name," "telephone," "fax," "address," "vendor name," "type of payment," "method of payment," "type of merchandise," "quantity of merchandise," or any other entry that may be present in a document. An image field may include a company logo, a signature, an image of a merchandise used in place of (or in addition to) a description of the merchandise, or any other image that may be included in a document.

Fields can be found in various types of documents, such as, invoices, financial documents, business cards, personal identification documents, loan applications, etc. Optical character recognition (OCR) of such a document may involve a preliminary step of identifying all the fields contained by the document, which may be performed by neural networks that are trained on a large number of (e.g., thousands) sample documents that include fields.

However, such an approach that uses a universal sample of documents may not provide field detection with adequate accuracy across different types of documents because the documents may differ significantly. In some cases that use such a universal sample of documents, the universal sample of documents may include documents of various types and layouts (e.g., one of each category of document type, or one of each type of document layout). Thus, a large number of each type of sample documents may be needed for training the neural networks. Such methods of field detection require long term, extensive training with many manual operations, lack flexibility, and pose a potential for disclosure of confidential data. Moreover, these methods also require accurate markup of each document where the markup serves as a marking and an identification of visual elements (as described in more detail in the description of block 410 of FIG. 4 below). However, when manual operations are involved to mark up the documents, the human users often omit or incorrectly mark the fields, thereby rendering the documents unsuitable for use as training samples. Additionally, to mitigate these incorrect markups, the user may have to redo the mark-up or mark up additional documents of the same type to start the training again.

As used herein, "document cluster" may refer to one or more documents combined in a group based on one or more of document characteristics (attributes). For example, these characteristics may include document type (for example, a picture, a text document, or a table, etc.), document category (for example, agreements, invoices, business cards, or checks), size of the document, layout of the document, language of the document, or a vendor referenced by the document etc. Furthermore, "clusters" as described in more detail below may refer to collections of documents of various sizes and types grouped according to a variety of schemes and methods. "Clusters" may refer to "basic clusters", "superclusters", and "generalized clusters".

Aspects and implementations of the instant disclosure address the above noted and other deficiencies of the existing technology by providing efficient and computationally adaptive mechanisms for training machine learning models and subsequently using them to detect and extract visual elements (e.g., images, numbers, text, words, fields, lines, tables, symbols, etc.) from a variety of documents. The mechanisms described herein can be self-trained on the client's side over a relatively short duration of time to process a various documents. For example, models can be trained and used to detect and classify fields on a user's or a client's documents. The models can also be used to extract specific information with a high degree of accuracy while excluding the possibility of disclosing confidential information. Implementations of the present disclosure can increase the precision of document processing, visual element detection, and data extraction upon the accumulation of a large amount of documents by switching to a different training approach or model on the client side.

The description below provides an overview of a system with reference to FIG. 1 which depicts a high-level component diagram of an illustrative system architecture 100 in accordance with one or more aspects of the present disclosure. System architecture 100 can include a computing device 110, a repository 120, and a server machine 150 connected to a network 130. Network 130 may be a public network (e.g., the Internet), a private network (e.g., a local area network (LAN) or wide area network (WAN)), or a combination thereof In one embodiment, computing device 110 may be a desktop computer, a laptop computer, a smartphone, a tablet computer, a server, a scanner, or any suitable computing device capable of performing the techniques described herein. Computing device 110 may receive one or more documents or documents. In an example, one or more documents 140 may be received by the computing device 110. Document(s) 140 may include an image of a document, a document page, or a part of a document page. The document page or the part of the document page depicted in document(s) 140 may include one or more fields with variable text. In an example, various document fields within the document may need to be detected. Document(s) 140 may be provided as an input to computing device 110.

The document(s) 140 may be used to train a set of machine learning models 114 or may be a new electronic document for which visual element (e.g. field/table) detection and/or classification is desired. In some implementations, if it is used for training one or more machine learning models 114 for subsequent recognition, the document 140 may be appropriately prepared to facilitate training. For instance, in the document 140, text sequences and/or table elements may be manually or automatically selected, characters may be marked, and text sequences/table elements may be normalized, scaled and/or binarized. In some implementations, text in the document(s) 140 may be recognized using any suitable optical character recognition (OCR) technique.

In one implementation, computing device 110 may include a field detection engine 111, a table detection engine 112, and a similarity measure determination engine 113. The field detection engine 111 may include instructions stored on one or more tangible, machine-readable storage media of the computing device 110 and executable by one or more processing devices of the computing device 110. In one embodiment, field detection engine 111 may generate as output a number of detected fields, content extracted from the detected fields, and/or an output document with a number of detected fields and content corresponding to the detected fields. In one embodiment, field detection engine 112 may use a trained machine learning model 114 that is trained to detect fields within document 140. The machine learning model 114 may be trained using training set of documents. In some instances, the machine learning model 114 may be part of the field detection engine 111 or may be accessed on another machine (e.g., server machine 150) by the field detection engine 111. Based on the output (e.g., heat maps corresponding to pixels of the image) of the trained machine learning model 114, the field detection engine 111 may identify a candidate region in the input document 140 that is detected as a particular field. The field detection engine 111 may also extract words belonging to the detected field.

In some implementations, the field detection engine 111 may include the table detection engine 112. In some implementations, the table detection engine 112 may be the integrated into the field detection engine so that a single engine is performing both detections. In some implementations, the field detection engine 111 and the table detection engine 112 may be two independent components. In other implementations, the field detection engine 111 and the table detection engine 112 may share some common components (e.g., some neural network functionality) but may have other components designated for use by only one of the engines. The field detection engine 111 and/or the table detection engine 112 may include instructions stored on one or more tangible, machine-readable storage media of the computing device 110 and executable by one or more processing devices of the computing device 110.

In one implementation, the field detection engine 111 and/or the table detection engine 112 may use a set of trained machine learning models 114 for field/table detection and/or classification. The machine learning models 114 can be trained and used to detect and/or classify visual elements such as fields/tables in an input document. Some of the machine learning models 114 may be shared by the field detection engine 111, the table detection engine 112, and the similarity measure determination engine 113, whereas some models may be used by only one of the engines. In the rest of this disclosure, the term "field detection engine 111" shall be understood to also encompass the table detection engine 112.

The field detection engine 111 may preprocess any documents prior to using the documents for training of the machine learning model(s) 114 and/or applying the trained machine learning model(s) 114 to the documents. In some instances, the trained machine learning model(s) 114 may be part of the field detection engine 111 or may be accessed on another machine (e.g., server machine 150) by the field detection engine 111. Based on the output of the trained machine learning model(s) 114, the field detection engine 111 may detect one or more fields and/or tables in the document and can classify each of the fields into one of a plurality of classes corresponding to predetermined field types.

Each of the field detection engine 111, the table detection engine 112, and the similarity measure determination engine 113 may be a client-based application or may be a combination of a client component and a server component. In some implementations, the field detection engine 111, the table detection engine 112, and the similarity measure determination engine 113 may execute entirely on the client computing device such as a tablet computer, a smart phone, a notebook computer, a camera, a video camera, or the like. In one implementation, the similarity measure determination engine 113 may include instructions stored on one or more tangible, machine-readable storage media of the computing device 110 and executable by one or more processing devices of the computing device 110. In one implementation, the similarity measure determination engine 113 may use a set of trained machine learning models 114 to determine one or more similarity measures of documents 140. The library 160 of documents may be stored in a repository 120. The machine learning models 114 are trained and used to determine similarity measures.

Alternatively, a client component of field detection engine 111 or the similarity measure determination engine 113 executing on a client computing device 110 may receive a document and transmit it to a server component of the field detection engine 111 or the similarity measure determination engine 113 respectively executing on a server device that performs the respective field detection/classification or similarity measure determination.

The server component of the field detection engine 111 may then return a recognition result (e.g., a predicted field type of a detected field, or a recognized table, or an association of a word to a table cell) to the client component of the field detection engine 111 executing on the client computing device for storage. Alternatively, the server component of the field detection engine 111 may provide a recognition result to another application.

Similarly, the server component of the similarity measure determination engine 113 may also return a determined similarity measure to the client component of the similarity measure determination engine 113 executing on the client computing device for storage. Alternatively, the server component of the similarity measure determination engine 113 may provide an identification result to another application. In other implementations, each of the field detection engine 111 and the similarity measure determination engine 113 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the machine learning model(s) 114 for field detection, table detection, and similarity measure determination. The machine learning model(s) 114, as illustrated in FIG. 1, may be trained by the training engine 151 using training data 126 that includes training inputs 122 and corresponding training outputs 124 (correct answers for respective training inputs). During training, patterns may be found in the training data 126 that map the training input 122 to the training output 124 (the answer to be predicted), and can subsequently be provided to the machine learning models 114 that capture these patterns for future predictions. These functions may be performed by the training engine 151. As described in more detail below, the set of machine learning models 114 may be composed of, e.g., a single level of linear or non-linear operations (e.g., a support vector machine [SVM]) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning model(s) 114 may include one or more neural networks as described in connection with FIGS. 4-8.

The machine learning model(s) 114 may be trained to detect text fields in the document 140, to determine the most probable field type for each of the fields in the document 140, to determine similarity measures between documents 140, and to determine the probability of pixels of images belonging to a specified document field, as further described below. For example, the training engine 151 may generate training data to train the machine learning model(s) 114 based on received documents 140. The training data may be stored in a repository 120 and include one or more training inputs 122 and one or more training outputs 124. The training data may also include mapping data 126 that maps the training inputs 122 to the training outputs 124. The training inputs 122 may include a training set of documents including text, images, or tables (also referred to as the "training documents"). Each of the training documents may be a document including a known field. The training outputs 124 may be classes representing field types corresponding to the known fields. For example, a first training document in the first training set may include a first known text field (e.g., "John Smith"). The first training document may be a first training input 122 that may be used to train the machine learning model(s) 114. The training output 124 corresponding to the first training input 122 may include a class representing a field type of the known text field (e.g., "name"). During the training of the initial classifier, the training engine 151 can find patterns in the training data that can be used to map the training inputs to the training outputs. The patterns can be subsequently used by the machine learning model(s) 114 for future predictions. For example, upon receiving an input of unknown text fields including unknown text (e.g., one or more unknown words), the trained machine learning model(s) 114 may predict a field type to which each of the unknown text fields belongs and may output a predicted class that identifies the predicted field type as an output. In another example, the field detection engine 111 may request heat maps for a number of keywords in the document 140. In some examples, model 114 may consist of a convolutional neural network. The field detection engine 111 may obtain one or more outputs from the trained machine learning model 114. The output may be a set of hypotheses for a document field location based on heat maps.

The repository 120 may be a persistent storage capable of storing documents as well as data structures to perform character recognition in accordance with implementations of the present disclosure. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

Figure 2:
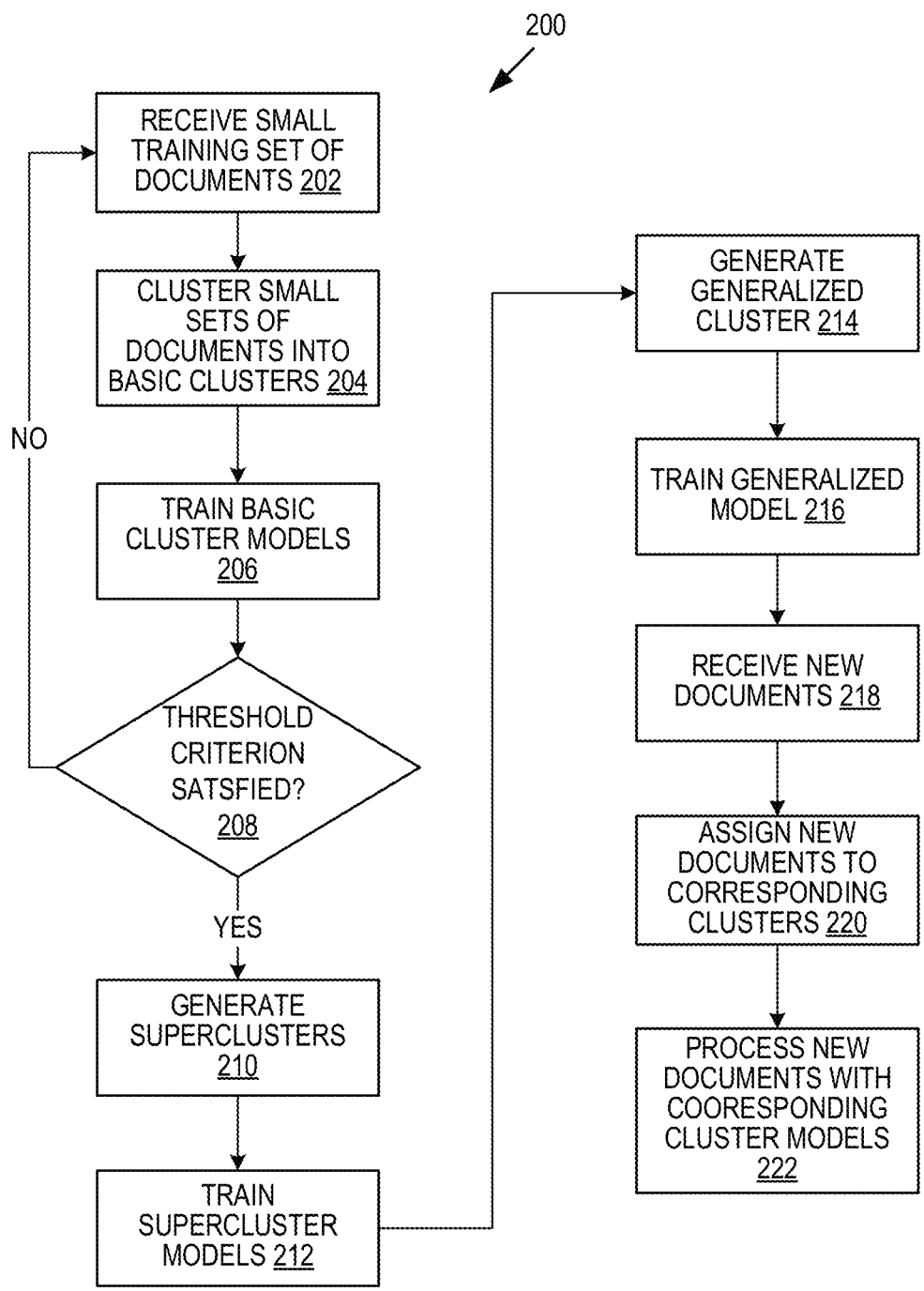
FIG. 2 is an example flow diagram of training and using machine learning models to process documents in accordance with some implementations of the present disclosure.

The description below provides a general overview of the methods disclosed herein with reference to FIG. 2 depicting a flow diagram of an example method of training and using models to process documents, and is followed by explanations of particular implementations. Overall, the methods include the use of relatively small sets of documents to train models for one type of training process until a predefined level of documents is collected at which point a different type of training process is used to train models based on the larger set of documents. The different sets of documents can be clustered and can provide for varying levels of accuracy of detection and extraction for a variety of different visual elements in the documents.

Method 200 may be performed by processing logic that may comprise hardware (e.g., circuitry, dedicated logic, programmable logic, microcode, etc.), software (such as instructions run on a processing device), firmware, or a combination thereof. In one implementation, method 200 may be performed by a processing device (e.g. a processing device 902 of FIG. 9) of a computing device 110 and/or a server machine 150 as described in connection with FIG. 1. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated descriptions list the operations of method 200 in certain order, various implementations of the methods may perform at least some of the described operations in parallel and/or in arbitrary selected orders.

In some implementations, at block 202, one or more relatively small sets (e.g., less than 10 items) of documents can be received. The documents can be pre-marked or a user can mark them to identify visual elements on the documents such as text, fields, and tables. The documents can have associated metadata describing various attributes and properties of the document as well as describing aspects of the mark up. As described in more detail with reference to FIG. 5 below the attributes and properties may be described by metadata including information regarding the layout, the type, the language, the category, the origin, as well as other aspects of the document. The markup can include identification of visual elements, words, fields, characters or images that may have been identified manually by a user or automatically either by a component of the system or an external automatic process. The documents of the small sets can be clustered, at block 204, and assigned to small clusters (also referred to as "basic clusters" herein) based on similarity of one or more attributes that the documents share. In this manner, basic clusters made up of similar types of documents can be created from the small sets of documents.

In some implementations, each basic cluster can be used to train, at block 206, a machine learning model to identify and detect visual elements on as well as extract visual elements from documents. As described in more detail with reference to FIG. 4, the machine learning model can be a system that receives document attributes and features as inputs (based on the aforementioned relatively small set of documents) and outputs a prediction of a location or the detection of a visual element of a certain type on a new input document. Such a model that is trained on a basic cluster (i.e., using the documents contained in a basic cluster) can be referred to herein as a basic cluster model. Each basic cluster model can be trained to detect one or more types of visual elements (e.g., particular character strings, fields, tables etc.) The types of visual elements intended to be detected by a given model can be determined by a pre-set user selection or on the basis of the attributes of the documents (i.e., the presence of a particular set of attributes correlates with the model operating to identify a specific type of visual element). This training using small sets of documents and basic clusters (also referred to herein as "fast training") can be performed continually as additional sets of documents are received. As more documents are obtained, more basic clusters each respectively focused on a different document attribute (i.e., each cluster containing documents that share a different attribute) can be created.

These basic clusters can be grouped together into larger clusters of documents. For example larger clusters can include documents that share an attribute which may be a different attribute that was used as a basis for their inclusion in their respective basic clusters. Attributes shared by larger numbers of documents may be more useful as bases for generating the superclusters. The attributes on which the superclusters are based may be predetermined by a user setting. Alternatively, the clusters can be generated for all attributes that all the documents in two or more clusters have in common. These larger clusters made up of basic clusters can be referred to herein as "superclusters". When a threshold criterion is met (e.g., an accumulation of a threshold number of total documents, or the creation of a threshold number of basic clusters), superclusters can be created, at block 210, and a second type of training mechanism can be initiated. This threshold criterion can be selected to optimize a quality metric of a model trained according to the approaches described herein. For example, a quality metric can measure the accuracy of visual element detection or recognition of a model trained on a basic cluster. In this example, a threshold number of accumulated documents or basic clusters (e.g., 2, 4, 5, 20, 50, 1000 etc.) can be selected to trigger the formation of superclusters on which models can be trained to optimize the quality metric. As explained in more detail with reference to FIGS. 6-7 this second type of training mechanism (also referred to herein as "deep training") can involve using the superclusters (i.e., the set/subset of basic clusters and their attributes along with their respective sets of documents included in the superclusters) to train newly generated or existing machine learning models. These machine learning models can receive sample documents as inputs and outputting a prediction of or the detection of a visual element on a newly input document after training. The models can be trained, at block 212, by methods described with reference to FIG. 6, to detect visual elements based on a larger training data set. In some embodiments, the training that uses the superclusters trains the respective models to detect different types of visual elements than the training that uses the basic clusters. The types of visual elements that the respective models are trained to detect may be pre-selected by a user or a setting or may be determined by the presence of other visual elements on the document identified by optical character recognition (OCR).

When one or more superclusters are created, the documents that have been received can further be grouped into a larger more general cluster at block 214. This larger, more inclusive, cluster is referred to herein as a "generalized cluster". This generalized cluster can include, for example, all or most of the superclusters along with their constituent basic clusters and respective documents. Similarly, newly generated or existing machine learning models can be trained, at block 216, using the generalized cluster to detect one or more visual elements on documents. This training, can therefore be based on an even larger, more encompassing, data set (i.e., larger relative to the data sets used to create the basic clusters or the superclusters). Accordingly, the machine learning models can be trained to detect visual elements that were different from those that were the targets of the trainings that used the basic clusters or the superclusters. These different types of visual elements can be determined based on a pre-set user selection or on the basis of the attributes shared by the documents in the generalized cluster.

In some implementations, new documents (i.e., documents that were not previously obtained or used to train any models) can be received at block 218. The newly received documents can be assigned, at block 220, to a cluster based on their similarity (as described in more detail with reference to FIG. 5) to the documents in the existing cluster. In some other implementations one or more of the newly received documents can be placed in a new cluster (i.e., a new cluster may be generated for a new document that is not sufficiently similar to the documents in an existing cluster.) The processes of determining the similarity between documents or between a document and a cluster and assigning a document to a cluster are explained further in blocks 501-525 of FIG. 5. Having been assigned to a cluster, a document can therefore also be assigned, at block 220, to a corresponding supercluster and generalized cluster. As noted above, each basic cluster is a subset of a larger cluster (i.e., a respective supercluster and generalized cluster) of documents. Then, with the clusters to which the newly received document belongs to having been identified, the models respectively corresponding to those clusters (i.e., basic cluster models, supercluster models, generalized cluster models) can be initiated for processing the document at block 222. Accordingly, the new document can be processed, at block 222, by the corresponding models to detect one or more visual elements. The visual elements can be identified or extracted for subsequent processing such as, for example, uploading to other software systems including enterprise resource planning systems, payment systems, and databases as well as for retrieval from such systems and modification therein.

Proceeding now to describe some of the features of the implementations of the disclosure in more detail, it should be understood that aspects of this disclosure provide mechanisms and methods for field detection in a document without an initial need to manually markup an extensive number of documents for training the neural network (i.e., machine learning model). The mechanisms and methods can provide for the fast training of a trainable model on a small data set, such as a data set including no more than ten documents of a specific type with marked up visual elements. Upon training a model for a specific class of documents, the model can be used to detect the visual elements in other user documents of the same class of documents.

In one embodiment, aspects of the disclosure provide for training the neural network using a small number of marked-up documents to be used as training documents. These documents may have metadata that identifies one or more document fields based on user markup that indicates location of the respective document fields. Metadata can include information such as a field identifier, field position/location, and field type. The field detection is based on identifying spatial distributions of fields with respect to visual reference elements within the training documents. After images of the documents are received, texts from the documents are obtained and various characters, including words, are obtained from the text in the documents. Reference elements on a document can be used to define the location of the marked up fields. Any structural element that belongs to the document layout can be used as reference element. A reference element can include predefined visual elements, such as, a predefined word (e.g., keywords, custom dictionary words), a predefined graphical element (e.g., a visual divider, a logo) etc. on the documents. Reference elements on the documents can be identified by matching words from a custom dictionary, and/or words that appear on a given document (or in the corpus of the documents) with a frequency that exceeds a predefined threshold frequency. For example, an invoice may include Company Name, Total, Due Date, etc. for reference elements based on the frequency at which these keywords may appear on these types of documents. Locations of various document fields can be defined relative to the reference element. In this manner, the fast training mechanism can train the models to detect visual elements using only a small set of documents. However, as documents accumulate and as more documents are received a deep training approach can be implemented.

The techniques described herein allow for automatic detection of visual elements in documents using artificial intelligence and deep learning. The techniques may involve training a neural network (e.g., a machine learning model) to detect fields in documents and may classify fields into predefined classes. Each of the predefined classes may correspond to a field type.

The neural network may include multiple neurons that are associated with learnable weights and biases. The neurons may be arranged in layers. The neural network may be trained on a training dataset of documents that contain known fields and/or tables. For example, the training data set may include examples of documents containing one or more fields/tables as training inputs and one or more field type and/or table identifiers that correctly correspond to the one or more fields/tables as training outputs. The neural network may generate an observed output for each training input. The observed output of the neural network may be compared with a training output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize prediction accuracy.

Once trained, the neural network may be used for the automatic detection of visual elements (e.g., fields/tables) in an input document and the selection or extraction of the most probable visual element type of each of the detected visual elements. The use of neural networks may prevent the need for manual markup of visual elements and element types (e.g., fields, field types, and tables) in documents. The mechanisms and methods described herein to detect visual elements in a document may improve the quality of detection results by performing visual element detection using a trained neural network in a way that takes into account a context of the entire document. For example, neural networks set and trained in accordance with implementations of this disclosure may be capable of improved accuracy of visual elements detection and classification of element types based on the kinds of alphanumeric sequences found in the entire document. For example, a neural network may identify a numerical sequence in the bottom-left corner of a document enclosed by characteristic boldfaced bar-colon punctuation mark as a bank routing number.

Consequently, a neural network trained to take into account the context of the whole document may be capable of more accurately identifying other visual elements of the same document as, e.g., address, amount, band account number, signature, or other fields typically present on a personal check. A neural network trained in accordance with implementations of this disclosure may be applied to identification of any type of documents and may enable efficient visual element detection, thus improving both the accuracy of identification as well as the processing speed of a computing device implementing such identification.

In various implementations of the present disclosure the grouping of documents into classes and clusters can facilitate further fast training or deep training of models. Some implementations allow for automatic clusterization of documents using artificial intelligence. The techniques may involve training a neural network to cluster documents into unspecified classes. As in the case of visual element detection, the neural network may include multiple neurons that are associated with learnable weights and biases. The neurons may be arranged in layers. The neural network may be trained on a training dataset of documents that contain known documents. For example, the training data set may include examples of documents belonging to predetermined classes or clusters as training inputs and one or more similarity measures, identifying how similar the document is to a particular class or cluster, as training outputs.

The neural network may generate an observed output for each training input. The observed output of the neural network may be compared with a target output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize the prediction accuracy. Once trained, the neural network may be used for automatic document clusterization using similarity measures between a document and known document clusters.

Figure 3:
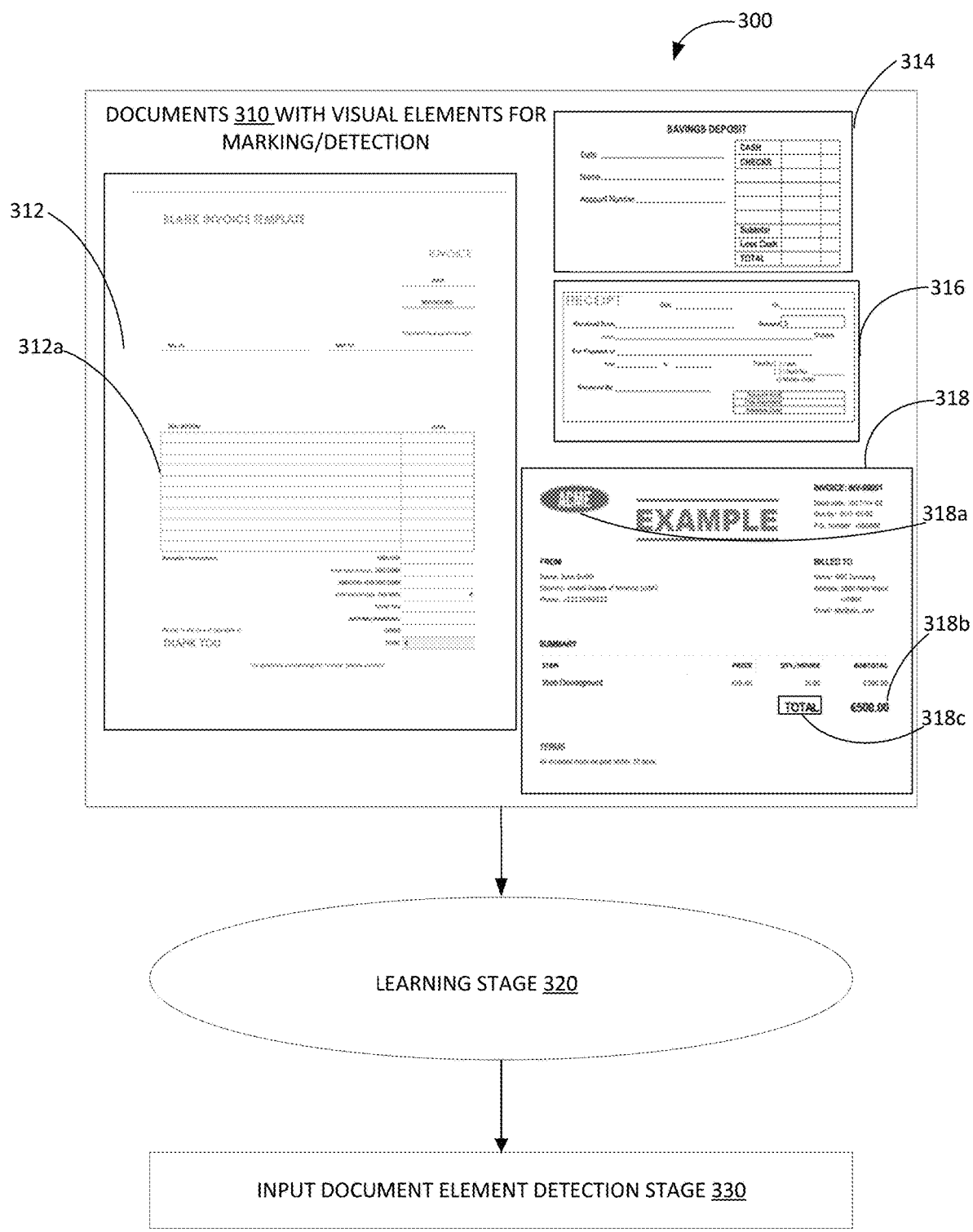
FIG. 3 depicts a high level flow diagram of an example method for field detection in a document, in accordance with some implementations of the present disclosure.

FIG. 3, depicts a high level flow diagram of an example method 300 for visual element detection in a document, in accordance with one or more aspects of the present disclosure. From a high level, the operation of the system can be logically divided in 2 stages. The first stage is the training stage 320, and the second stage is input document field detection stage 330. In some implementations, stage 320 may correspond to blocks 202-206 of FIG. 2 and blocks 420-470 of FIG. 4 described in more detail below. The learning stage 320 can receive as input various documents 310 containing various visual elements such as fields. In the depicted example, documents 310 include a bank invoice template 312, a savings deposit 314, a receipt 316, an invoice 318, etc. Each of the documents 310 contain multiple fields. For example, bank invoice template 312 includes fields in the form of a table 312a with two columns and multiple rows, invoice 318 includes a graphics field containing a logo 318a, a text field containing numbers 318b, etc.

Upon receipt of documents 310, at the learning stage 320 each type of documents can be processed in order for the system to learn from the markup of fields in these documents. As described in more detail in blocks 420-470 of FIG. 4, one or more models 114 can be derived or generated at the learning stage 320 for detecting fields in documents. At the input document field detection stage 330, the system can process an input document to detect the structure of the input document, detect the field(s) within the input document based on models 114 generated or taught in the learning stage 320, and extract fields with their respective contents.

Figure 4:
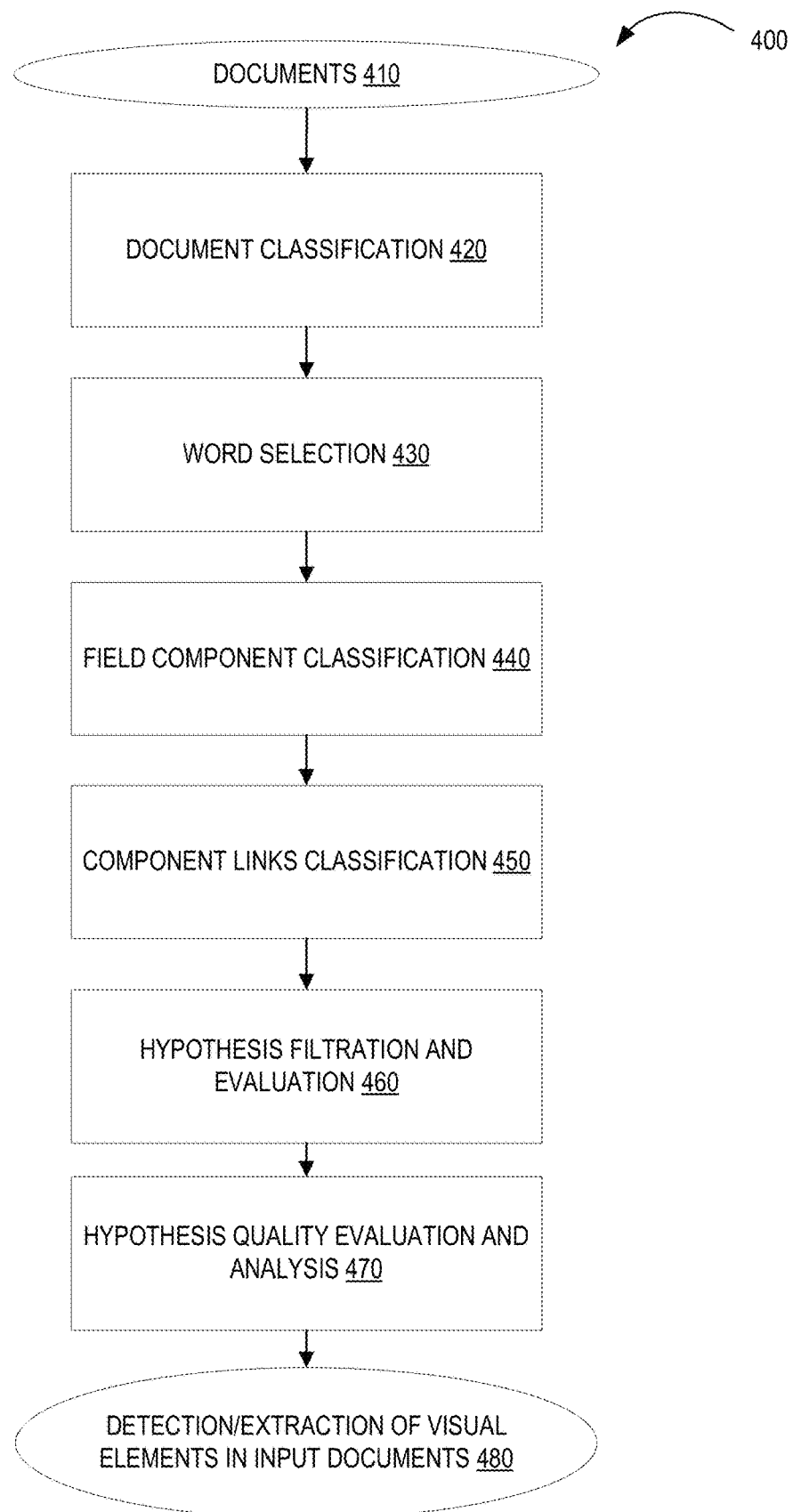
FIG. 4 illustrates a high level flow diagram of an example method for field detection in a document, in accordance with some implementations of the present disclosure.

FIG. 4 depicts a block diagram of various stages of visual element detection performed by the components of an example system 400, in accordance with one or more aspects of the present disclosure. Blocks 420-470 of FIG. 4 correspond to one implementation of stage 320 of FIG. 3 while block 480 corresponds to block 330 of FIG. 3. Accordingly, blocks 420-470 and 480 of FIG. 4 may respectively correspond to blocks 202-206 and 222 of FIG. 2. In some implementations, a user, such as a human user or a computer system user, can identify a small number of documents 410 containing one or more visual elements. The user can identify each type of document on which visual element detection is to be performed using the system 400. In an implementation, the user can markup visual elements on the identified documents 410. To markup a visual element, a user can draw lines, circles, boxes, rectangles or other shapes, highlight, or otherwise create markings on or surrounding a portion of a document to designate the area as the identified visual element. The user can markup multiple visual elements on each document that are desired to be detected after training, such "Total" and "Address" fields. In addition, the user markup can also include identification of the marked up fields (e.g., "Date," "Total," etc.). A "small number," as used herein, can represent 3-5 documents, for example. In an example, no more than ten documents of a specific type are marked up by a user. The user can markup all visual elements in the document, or mark selective visual elements on the document. In some implementations each visual element can be identified and marked independently of other visual elements on the document. In this manner the markup can be included in metadata associated with each document 410.

In some implementations, the user can then upload the identified documents to the system 400 as electronic documents. Electronic documents can be scanned images, photographed images, or any other representation of a document that is capable of being converted into a data form accessible to a computer. The uploaded documents are referred to herein as documents 410. In an implementation, the user can upload documents that already include marked-up visual elements. In another implementation, the user can electronically markup the documents 410 using a user interface of the system 400. For example, using a user interface, the user can indicate (e.g., by clicking on, dragging on, or using other gestures, etc.) the portion of a document comprising required word, numbers, etc. and further the system 400 can mark up the surrounding boundaries of the visual element automatically.

In some implementations, the received documents can be automatically grouped into various preliminary clusters such that each cluster has similar documents, which in turn can help the user to mark up the visual elements correctly. System 400 associates each document 410 with a metadata identifying a particular document visual element based on the markup in the document (e.g., the markup previously provided by the user or automatically generated by the system 400). In some examples, the metadata identifies a visual element such as a document field containing a variable text. In some implementations, system 400 categorizes each document 410 into a particular document class at document classification block 420. For example, the documents may be classified into a particular class based on similarity of document attributes. In one example, documents may be classified based on vendor name associated with the document. For each class, a small selection of documents (e.g., 2-6 documents) can be collected in system 400. Grouping of documents via such classification or clusterization is described in more detail below with reference to FIG. 5.

In some implementations, at word selection block 430, a subunit of system 400 can use a heuristic algorithm to analyze document text. The text can be analyzed for the presence of a set of words a given document layout based on character types, such as letters, numerals, separators, etc. Heuristics can involve problem-solving by experimental and/or trial-and-error methods. A heuristic algorithm can be derived by using some function that is included in a system for searching for a solution, often using decision trees. The algorithm can include steps for adjusting weights of branches of the decision tree based on the likelihood of a branch to lead to the ultimate goal node. Here, heuristics can be used to separate lines of text into groups of same type of characters. In an implementation, at block 430, the system 400 obtains text from the document 410 and splits the document text into continuous subsequences of characters. The character subsequences may belong to the same character type. For example, the character types can include letters, numbers, and separators. The text can be separates into individual words. The system 400 can obtain all possible words in the document 410.

In some implementations, at fields component classification block 440, system 400 classifies each word of the document 410 based on the likelihood of the word to be included within the boundaries of a visual element such as a particular field. In some implementations, reference elements on a document are used to define the location of another visual element on the document 410. Any structural element that belongs to the document layout can be used as reference element. A reference element can include a pre-defined word (e.g., keyword), a predefined graphical element (e.g., a visual divider, a logo) etc. In some implementations, a set of reference elements can be obtained using the training sample of documents. In some examples, reference elements can be identified using custom dictionaries of words, various word-character separators, stamps, and other pre-defined text and/or visual elements in the document.

A reference element can act as a focus point with respect to which the location of a document field is defined. In some implementations, a document field's location (also referred to herein as "field region") can be identified relative to the reference element. In the example of FIG. 3, a document field location (e.g., location of numbers 318*b*) corresponding to the reference element "total" can be identified relative to the location of the reference element "total" in the document. For each document in the training set of documents (e.g., documents 410), the location of the document field can be obtained based on the markup of the training sample documents. In an implementation, system 400 associates metadata with a particular document field based on the user markup on the document. The metadata can define the location of the document field relative to the reference element. The document field location can be expressed in terms of a range of locations, number of pixels, etc. The document field location can include a region on the document. A region can have a specific geometric shape, but not limited to, for example, a rectangle, quadrilateral, ellipse, circle, other polygon, etc.

In some implementations, a heat map can be used to determine the likelihood of a word in the document being included in a particular field. For each given field in the training data set, a heat map can be generated with respect to each reference element. "Heat map" refers to a set of numeric elements, such that the value of each element is defined by a certain function computed at the image coordinates reflecting the position of the element. In some implementations, the heat map may be represented by a rectangular matrix, such as a table, a grid, etc. Each element of the heat map corresponds to a certain pixel in the vicinity of a reference element, such that the value associated with each pixel reflects the number of training documents in which the given field contains this pixel. Different data structures can be used to represent a heat map. For example, a heat map can be represented using histograms, charts, tables with cells, graphs, plots, etc. A heat map is a data visualization technique that shows magnitude of a phenomenon using color in two dimensions. The numeric values of heat map elements can be color coded for visualization (hence, the term), however, this step would be superfluous for neural network training, in which the numeric values, rather than colors, are used.

In some implementations, a heat map can be generated for each reference element in the set of training documents 410. The heat map is generated using the location of a document field relative to the reference element based on the metadata associated with the training documents. For example, a location of a document field can be represented by particular pixels on the image included within a box surrounding the document field (i.e., a bounding box), as identified by the markup of the document. The heat map can be represented by a data structure that includes a plurality of heat map elements. For example, a heat map can be created by dividing an image into a rectangular grid with a specified cell size in pixels. In this example, the grid represents the heat map data structure and the cells represents the heat map elements. The image used for the heat map can correspond to each of the training documents, and each of the plurality of heat map elements can correspond to each of a number of document pixels of the corresponding training document. In an example, for each pair of values consisting of a reference element and a document field location in the training set of documents, the cell is filled with a value that equals to the fraction of the area occupied by the region for the document field contained within the cell.

In an implementation, for a chosen reference element for which a heat map is being created, a relative location of a field corresponding the reference element is determined in each of the training documents. For example, in a hypothetic first training document, a numeric value "$1000" can be found 50 pixels to the right of the location of the reference element "Total." For the heat map data structure of the reference element "total," it is determined whether each document pixel in the first image corresponding to each heat map element (e.g., a cell) is included into a document field location as identified by the markup on the document. If any document pixel is fully contained within the document field location (e.g., the region covered by the document field), then the heat map element corresponding to that document pixel is assigned a value of "1." For example, the value of a cell is set to "1" when the cell corresponds to an image pixel in the document that is contained into the marked up portion of the document covering the region for "$1000." The value of a cell is set to "0" when it corresponds to an image pixel in the document that is not occupied by the field region "$1000." In one implementation, the value set in the cell indicates the number of documents in which the field contains a pixel corresponding to the heat map element. Thus, as more documents are processed, the heat map element stores a counter of the number of documents in which the document field contains a document pixel associated with the heat map element.

System 400 continues to update the heat map for the chosen reference element using the next document in the training set of documents 410. Values of the heat map elements are updated to add the new values reflecting the next document. For example, if the value of a particular cell in the heat map was already set to "1," and the cell corresponds to an image pixel in the next document that is contained within the field region "$1000," then the value of the cell is incremented by a value of "1," to equal to a value of "2." System 400 continues to aggregate the values of the heat map element for each of the documents in the training set of documents to identify the image pixels contained within a particular document field. In some implementations, the final histogram of the relative location for the selected reference element is considered to be the arithmetic mean of values in respective cells of the heat maps.

In some implementations, system 400 can update the heat map for the chosen reference element to include heat map element values that relate to another document field. That is, for the chosen reference element for which the heat map is being built, the location of a different field is identified from all of the training documents. The location is identified relative to the chosen reference element for the heat map. For example, a location of the "invoice date" filed relative to the reference element "total" can be identified in the heat map, by setting the value of the heat map elements to "1" where the heat map elements correspond to the image pixels that are contained in the "invoice date" field in a first training image. Similarly, values of the heat map elements are aggregated for each additional document in the training set for the location of "invoice date" field relative to the reference element "total." Thus, a heat map for a chosen reference element can identify potential locations of each visual element (e.g. field) of the document with respect to the chosen reference element. Accordingly, the training phase may involve generating the heat maps of a relatively small set of training documents that are accompanied by metadata indicating the locations of the visual elements. The generated heat maps may later be used for identifying the visual element locations in other documents.

In some implementations, system 400 uses heat map attributes to classify each possible word found in the documents 410 for the likelihood of the word to be contained in a particular visual element region. The locations of the particular field regions identified in the heat maps relative to the reference elements are used as localizing features of the hypothesis generated at fields component classification block 440. At the output of block 440, one or more sets of field component hypotheses are generated. The hypotheses can indicate a probable location of a visual element within a document relative to a reference element. The probable location is determined based on the positive examples identified using the heat maps.

In some implementations, system 400 evaluates internal format of the extracted content of the identified fields in the training set of documents 410 using BPE (Byte Pair Encoding) tokens. BPE token refers to a numeric vector representing an input text. In some implementations, the vector can be represented by an embedding of an interim representation of the input text, such that the interim representation may utilize an artificial alphabet, each symbol of which can encode a substring of one or more characters of the input text, as described in more detail herein below. The embeddings are generated in such a manner that semantically close inputs would produce numerically close embeddings.

In some implementations, the BPE tokens are used for the content of the detected fields in the training dataset (e.g., training documents). As noted above, an artificial alphabet of symbols can be derived for using as BPE tokens (e.g., encodings). The alphabet includes individual characters and tokens of two characters, three characters, etc. In an example, the alphabet can include a thousand or more symbols representing different combinations of characters. Each word, or characters in the word, in the training documents can be represented using symbols from the derived alphabet representing the word, or the characters, to derive tokenized content. BPE embeddings, which are vector representation of the BPE tokens, are then derived.

In some implementations, system 400 performs component links classification at block 450 to the resulting hypotheses from block 440. For each pair of components (e.g., words), system 400 calculates an estimate of the pair's joint membership in the hypothesized visual element of the document. For example, a hypothesized visual element may include multiple words, such as, an address field that includes a street number, street name, city, state, country, etc. Additionally, the possible locations of the visual elements identified in the heat maps can include multiple words. Accordingly, each hypotheses includes a sequence of one or more words from the multiple words matching the locations of the visual element.

In some implementations, system 400 applies performs hypotheses filtration and evaluation, at block 460, on the resulting data from block 450. Additional visual element properties are used for filtering and evaluation of hypotheses obtained from block 450. In an implementation, the parameters can be set by a user of the system 400. For example, the user can set a parameter for the content of a visual element to be multi-line or single line. In an example, the user can set a parameter to indicate that a "date" or "total" field in an invoice document can only be a single-line. In another implementation, the system 400 can set a parameter associated with a type of document. For example, the system 400 can set parameters such as geometric visual element parameters, threshold values, etc. These parameters can be defined based on a heuristic method. A typical heuristic algorithm is derived by using some function that is included in a system for searching a solution, often using decision trees.

In some implementations, system 400 performs hypotheses quality evaluation and analysis at block 470 to evaluate the overall quality of the obtained hypotheses. In some examples, the hypotheses are obtained from block 460. In other examples, the hypotheses may be obtained from another stage of the operation of system 400. Various threshold may be defined in the system to assess the quality of the hypotheses. For example, a set of words can be identified as being in a "confident" group when the probability of the set of words of belonging to a visual element (e.g., a field) at the classification output is higher than a specified threshold. Hypothesis quality evaluation can involve identifying a "confident" word and words that are "reliably" linked to the confident word. Whether the words are "reliably" associated can be determined using a heuristically configurable threshold, for example, identifying what value above the configured threshold is accepted as reliably linked, what value below the specified threshold is accepted as an unreliable link, etc. For example, the specified threshold can be obtained by training a large sample of data received from the client by a suitable machine learning method and by testing its value by cross validation or other suitable method. Additionally, further analysis of the documents can be performed by comparing the fields of the hypothesis having the highest quality to other hypotheses.

In some implementations, system 400 performs detection or extraction of visual elements at block 480, to detect and classify visual elements on other input document(s) 410. System 400 may detect visual element according to the selected hypotheses of a potential visual element with a quality value that meets a defined quality threshold and/or obtained analysis results on internal format of the content within the potential visual element. For example, when system 400 receives an input document for field detection and retrieval, system 400 can detect fields on the input document, classify the fields, and extract content within the detected fields. In some examples, system 400 can automatically upload the document with the detected fields and retrieved content to a data store, and/or a software portal.

In some implementations, system 400 may receive an input document and may identify, within the input document, a candidate region for each visual element of interest based on the heat maps built for this visual element with respect to one or more reference elements. Each identified candidate region would include the input document pixels corresponding to heat map elements satisfying a threshold condition (e.g., having their respective values exceeding a threshold, selecting a pre-defined share of pixels having the largest values, etc.). The selected candidate regions may then be treated as the positions of the corresponding visual element, i.e., by applying OCR techniques to the image fragments lying within the candidate regions.

In some implementations, content extracted from each detected visual element can be evaluated using BPE tokens, by evaluating the differences (e.g., Euclidian distances) between the BPE token representing the extracted content of a given visual element of the input document and the BPE tokens computed for the same visual element in the training documents. If the computed distance between the BPE token representing the content extracted from a candidate visual element and the aggregate (e.g., mean, average) of the BPE token(s) representing the same visual element in the training data set is less than a threshold, the likelihood that the visual element is detected correctly is relatively high, and the candidate visual element may be accepted for information extraction.

In some implementations, after receiving a large set of documents (e.g., several thousand documents), system 400 can repeat the training process but with errors identified in the visual element detection process. This can further improve the quality of the visual element detection.

In some implementations, system 400 can determine the accuracy of the user markup on the training documents and correct any inaccuracy that is detected. Documents with custom visual element markup can be received as training input. The markup in the batch of documents can be complete (correct), partial, inconsistent (the same visual elements are marked in different places), or completely erroneous. This markup can exactly represent the markup that the user performed at the outset. For each marked visual element, possible stable combinations of the relative position of other visual elements can be detected based on the markup of other visual elements, the search for these visual elements by the system, and various keywords (e.g., frequency words that are included in the visual element region). The relative position of these visual elements can be determined by the absolute location (e.g., as it relates to the document the visual element is on, such as a line number or pixel identification on the document) or relative location (i.e, from a reference element, e.g., as compared to a particular element on the document, such as, a "total" field being to the right of the "date" field by 100 pixels), or the zone (e.g., range) of acceptable location (distribution) of certain visual elements or keywords (e.g., an indication that a "client number" field must always be to the left of the "client name" field and no further than 100 pixels away, otherwise it is considered to be not a value for the field). The visual elements for which there are stable combinations of other visual elements and keywords, and for which these combinations are repeated or correlated from document to document, can be considered stable and probably correctly marked. Visual elements for which no stable regularities are found can be considered either incorrectly marked or singly marked. Visual elements of the same type (e.g., "total") with different stable structures or combinations on different sets of documents are considered either inconsistent (e.g., if the documents belong to the same cluster or come from vendor) or reveal heterogeneity of the documents on which they are located.

Thus, the system can verify the correctness of the received markup and predict markup with a high confidence level when the system is first started with a only small number of documents necessary for starting the training of the system, assuming that the system contains a universal pre-trained markup machine learning model containing standard rules regarding the intended types of user documents. Further, when collecting user markup statistics, the model is trained on user documents in the opposite direction, knowing stable combinations of visual elements and keywords, the system can identify areas of possible location of unmarked visual elements or incorrectly marked visual elements and give the user hints. For example, the system can provide hints on how to mark up a particular document correctly, or upload a selection of documents where the markup is clearly incorrect and needs to be corrected. However, these operations are facilitated by efficient clusterization of the documents occurring at block 420 and further described in more detail with reference to FIG. 5 below.

Figure 5:
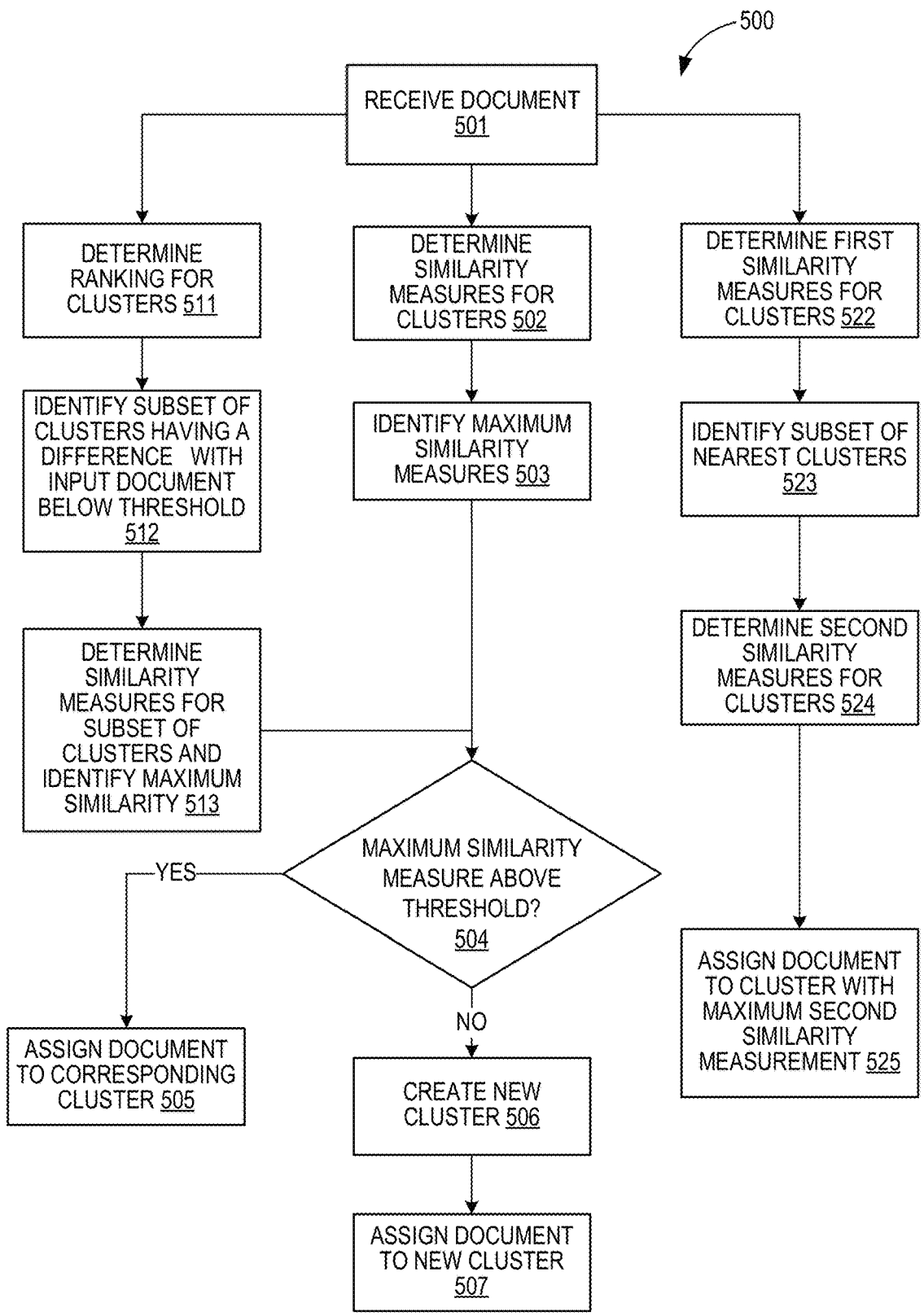
FIG. 5 is a flow diagram illustrating one exemplary method of document clusterization, in accordance with some implementations of the present disclosure.

FIG. 5 is a flow diagram illustrating exemplary method 500 of document clusterization mentioned earlier with reference to block 204 in FIG. 2, in accordance with some implementations of the present disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 may be performed by a processing device (e.g. a processing device 902 of FIG. 9) of a computing device 110 and/or a server machine 150 as described in connection with FIG. 1. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated descriptions list the operations of method 500 in certain order, various implementations of the methods may perform at least some of the described operations in parallel and/or in arbitrary selected orders. In some implementations, the operations pertaining to grouping or clustering documents described with reference to FIG. 5 may correspond to blocks 204, 210, 214, and 220 of FIG. 2.

At block 501, the device performing method 500 may receive one or more documents from a document repository. A document repository may be an electronic storage device that can be used to store data. This includes but is not limited to internal and external hard drives, CDs, DVDs, Floppy Disks, USB drives, ZIP disks, magnetic tapes and SD cards. A repository may contain multiple folders and subfolders. A document may be a text document, a PDF document, a picture document, a photo image, etc.

At block 502, the device performing method 500 may determine, for a document 140 obtained by the device externally or from the repository 120, a similarity measure for each of one or more existing clusters of documents. A similarity measure reflects the degree of similarity between the document 140 and a document cluster (which may include one or more documents). Such a similarity measure may be calculated using a similarity function, which, given two documents as an input, produces a number indicative of degree of similarity between these two documents. In some implementations of the present disclosure, the output of the similarity function can be a number between 0 and 1.

In some implementations, the similarity function can be an analytical function (i.e., may be expressed by a mathematical formula). In some implementations, the similarity function may be implemented as an algorithm (e.g., described as a sequence of actions). The similarity function may use one or more document attributes (e.g., attributes included in metadata associated with a document) to determine degree of similarity between documents. For example, the number of attributes that two documents may have in common may correlate to the aforementioned value between 0 and 1 to indicate the similarity between documents.

In some implementations, grid type document attributes are used to determine degree of similarity. Grid type document attributes are calculated by breaking a document into multiple cells, forming a grid, and calculating image attributes for each cell. In order to compare two documents using grid type attributes, attributes for a cell of a first document are compared with attributes for a corresponding (i.e., similarly positioned) cell of a second document. Results of cell-by-cell comparisons are used to determine degree of similarity between the entire documents.

In some implementations, singular value decomposition (SVD) type of document attributes are used to determine the degree of similarity. SVD type document attributes are determined using singular value decomposition of word matrix with corresponding word frequency. Any document may be characterized by a set of words present in the document and frequency of their use in the document. A set of mappings can be created, such that each mapping associates a word with the number of occurrences of the word in the document. For example, the set of mapping may be represented by a table that lists words (or their identifiers) in the first column and number of times the word in present in the document in the second column. Such a high-rank matrix may be converted to a lower-rank matrix that can be used as an SVD type attribute of a document.

In some implementations, image type attributes of document can be used to determine degree of similarity between two documents. An image attribute is a set of parameters produced by a convolutional neural network processing a document image. An image attribute is usually a set of numbers that encode the document image.

In some implementations of the present invention, the similarity function uses one or more of the above-listed attributes to determine a similarity measure between two documents. In some implementations, the similarity function uses other types of document attributes, not listed above, sometimes in combinations with the above-identified types of attributes. In some implementations of the present invention, the similarity function may be realized using gradient boosting. In some implementations, the similarity function is realized as a neural network (e.g., a trained neural network model).

In some implementations, in order to determine similarity measure for a document 140 and a document cluster, the similarity function is calculated for the document 140 and each document of a subset of one or more of documents from the document cluster. In some implementations, the subset of documents from the document cluster for calculating the similarity measure can be selected at random. In some implementations, the similarity measures of the selected documents from the document cluster and the document 140 can be averaged to produce the similarity measure of the document cluster and the document 140.

In some implementations, in order to determine similarity measure for a document 140 and a document cluster, the similarity functions is calculated for the document 140 and the centroid of the document cluster. The centroid of a document cluster is a document having its attributes equal or close to equal to the average values of one or more of the document attributes for one or more of the documents in the cluster.

At block 503 the device performing method 500 may determine which of the document clusters has the highest similarity measure to the document 140 as determined at block 502. At block 504, the device performing method 500 may compare the highest similarity measure with a predetermined similarity threshold. If the highest similarity measure is above the threshold, the device may, at block 505, assign the document 140 to the cluster that corresponds to the highest similarity measure. In some implementations of the present invention, after the document 140 is assigned to a cluster, the device performing method 500 recalculates the centroid of this cluster. However, if the device performing method 500 determines that the highest similarity measure is below the threshold, the device can create a new document cluster at block 506. Then, the device may, at block 507, assign the document 140 to that new cluster.

In some implementations, a user may identify documents that have been erroneously assigned to an inappropriate cluster by the system. In some implementations the user may also identify correct cluster for such document. In such instances the mistake may be recorded by the system and the similarity function may be adjusted to compensate for the mistake.

In some implementations of the present invention, document clusterization method 500 includes a second level or alternative differential classification of the clusters. In the alternative implementation, the device performing method 500 analyzes clusters of documents using a first similarity measure determined at block 522, in a manner analogous to the determination occurring at block 502, to identify a group of adjacent clusters. Two or more clusters are adjacent to each other if the distance between their centroids is less than a predetermined degree of separation. Such clusters may form a subset of clusters consisting of two or more clusters with substantially close similarity measures.

In some implementations, after a document 140 is received by the device performing method 500 at block 501, the first similarity measure determined at block 522 is utilized to identify, at block 523, the nearest subset of clusters to the document 140. Then, as shown in block 524, a second, more sensitive, similarity function can be used to determine a second set of similarity measures for the clusters from the subset of clusters, identified in block 523. At block 525, based on the second similarity measures, the device can determine a document cluster closest to the input document 140 and assign the document 140 to this cluster.

In yet other alternative implementations of method 500 of the present invention, a ranking function based on similarity measure is used to identify the most promising clusters for the document 140. The ranking function calculates probability of the document 10 being significantly similar to a given document cluster. After the device performing the method 500 receives an input document 140 at block 501, the ranking function is applied, at block 511, to the document clusters to calculate probability of the document 140 belonging to a particular cluster. At block 512, a subset of document clusters with high probability of similarity to the document 140 may be identified. In some implementations, this subset includes at least a predetermined number of document clusters with highest probabilities of similarity. In some implementations, the subset includes all document clusters with the probability of similarity to the document 140 exceeding a predetermined probability threshold. Then, at block 513, for the document clusters from the subset of document clusters identified at block 512, the device can calculate more accurate similarity measures (e.g., similarity measures that operate on a larger number of document attributes). From these similarity measures, the highest similarity measure can be identified.

Then after the determination of similarity measures for the subset of clusters and the identification of the maximum similarity measure, at block 504, the device performing method 500 can compare the highest similarity measure with a predetermined similarity threshold, similarly to the process previously described occurring after block 503. If the highest similarity measure is above the threshold, the device may, at block 505, assign the document 140 to the cluster that corresponds to the highest similarity measure. If the device performing method 500 determines that the highest similarity measure is below the threshold, the device may, at block 506, create a new document cluster. Then, the device may, at block 507, assign the document 140 to that new cluster.

In some implementations of the present invention, the device may perform a step of cluster minimization. The clusters created by method 500 and previously created clusters are analyzed to identify attributes satisfying one or more cluster merging criteria. Two or more clusters having documents with attributes corresponding to these criteria may be merged to form bigger clusters. In some implementations, the device may recalculate centroids of the resulting clusters. Each of the clusters referenced in connection with the performance of method 500 can be one of a basic cluster, a super cluster, or a generalized cluster described in connection with FIG. 2 and elsewhere in the disclosure.

The above-described method may be utilized for various use cases. In an illustrative example, the method may be utilized for grouping documents by parties referenced in the document. Input stream of documents may include such documents as applications, invoices, bills of landing, purchase orders, etc. Most of these documents originate from an organization and include name and address of this organization. The exact list of these organizations may not exist. Also, documents from new organizations may be added to the input stream at any time.

The method of the present invention allows grouping of these documents by the originating organization. In other implementation, the present method may allow grouping of such documents by geographical locations referenced in these documents (from the same organization or different organizations). In another implementation, the documents may be grouped by their format or layout (e.g., all invoices grouped together, separately from purchase orders, receipts, bills of lading, etc.). In another implementations, the documents may be grouped by specific items (e.g., goods or types of goods) references in these documents. In another implementations, the documents may be grouped by language. These examples are illustrative and do not limit the present invention in any form.

With the documents 140 clustered in accordance with an example method 500 and models initially trained in accordance with the fast training performed by system 400, upon the satisfaction of a predetermined threshold criterion (e.g., an accumulation of a predetermined number of documents, or the generation of a predetermined number of clusters/basic clusters) an additional deep training approach for identifying/detecting visual elements in documents can be implemented.

Figure 6:
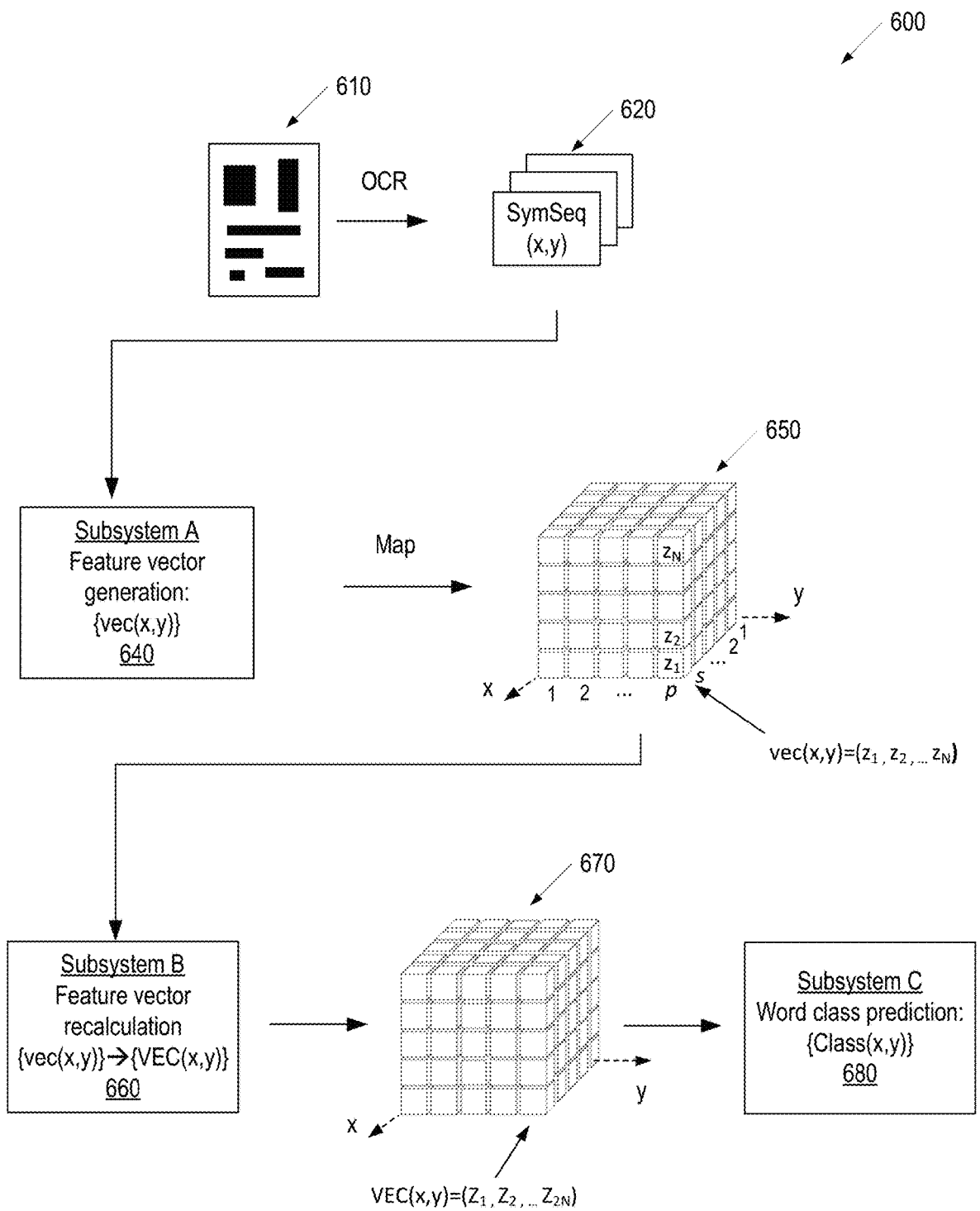
FIG. 6 is a schematic diagram illustrating an example a neural network system identification of visual elements in documents, in accordance with some implementations of the present disclosure.

FIG. 6 is a schematic diagram illustrating an example 600 of a neural network system that uses global document context for identification of visual elements such as fields and tables, in accordance with some implementations of the present disclosure. The neural network system 600 may include multiple neurons that are associated with learnable weights and biases. The neurons may be arranged in layers. As illustrated, the neural network system 600 may include a subsystem (subnetwork) A 640, a subsystem B 660, and a subsystem C 680. Each of the subsystems 640, 660, and 680 may include multiple neuron layers and may be configured to perform one or more functions for visual element detection in accordance with the present disclosure. In some implementations, operations pertaining to training described in FIG. 6 may correspond to blocks 212 and 216 of FIG. 2.

The neural network system 600 may operate on a document image 610, which may be an image of the document 140, in some implementations. The document image 610 may be obtained by imaging (e.g., scanning, photographing, etc.) of the document 140. The imaging may occur immediately before the document image 610 is processed by the neural network system 600, in some implementations. In some implementations, the imaging may have occurred at some point in the past, and the document image 610 may be obtained from a local or network (e.g., cloud) storage. The document image 610 may undergo optical character recognition (OCR), either immediately before further processing by the neural network system 600 or at some point in the past. The OCR may be accompanied with pre-processing of the document image 610 to improve its quality, e.g., scaling, changing the aspect ratio, gray-scaling, normalization, data augmentation, amplification, binarization, and so on.

The outcome of the OCR of the document image 610 may be a set of recognized sequences of symbols SymSeq(x,y) associated with the coordinates x, y of the document image 610. The symbol sequences SymSeq may be include one or more alphanumeric characters that may be combined into syllables, words, and/or sentences. The symbol sequences SymSeq may be one or more punctuation marks, such as a comma, period, ellipses, or any other marks. The sequences SymSeq may be horizontal, vertical, or oblique lines of tables, or three-way or four-way intersections of the lines. The lines may be single, double, etc. The symbol sequences SymSeq may be any combinations of characters, punctuation marks, and/or lines. In some implementations, to generate the symbol sequences SymSeq contained in the document image 610, the field detection engine 111 (or any other component that performs or has performed OCR on the document image 2610) may use suitable character recognition methods, divide the text of the document into multiple words, and extract multiple character sequences from the words.

The identified symbol sequences SymSeq may be mapped to the corresponding regions of the document image 610 where these sequences are located. For example, each SymSeq may be associated with one or more sets of coordinates (x,y) that identify locations of the sequences. The coordinates may be Cartesian coordinates or any other (e.g., polar) coordinates that may be convenient in identifying locations of the symbol sequences. A single character, punctuation mark, or a short line may be identified by a single set of coordinates (x,y) whereas longer sequences (words, sentences, long lines) may be identified by multiple sets (x,y), such as the coordinates of the four corners of a box enclosing the sequence, in one implementation. A lines may be identified by the coordinates of the two ends of the line. An intersection of two lines (e.g., a three-way or a four-way intersection) may be identified by the coordinates of the ends of all lines as well as the coordinates of the intersection. In this disclosure, (x,y) shall denote any identification of symbol sequences with one or more set of coordinates, as may be needed for a specific SymSeq.

The field detection engine 111 may input the symbol sequences SymSeq(x,y) into the subsystem A 640 to generate feature vector representations for each of the symbol sequences: SymSeq(x,y)→vec(x,y). Each of the feature vectors vec(x,y) may be a symbolic vector embedding of one of the symbol sequences (e.g., words/sentences, punctuation marks and/or lines), which is also referred to as a word embedding. In some implementations, each of the symbolic vector embeddings may have a certain length (e.g., a predetermined length). When the length of a character sequence is shorter than the certain length, predetermined values may be added to generate a symbolic vector embedding of the predetermine length (e.g., zeros may be added to the vectors). "Symbolic vector embedding" or "vector embedding" as used herein may refer to a vector of real numbers or any other numeric representation of a symbol sequence. A vector embedding may be produced, for example, by a neural network implementing a mathematical transformation on symbols (words/punctuation marks/lines of tables) using embedding functions to map such symbols into their numeric representations.

The vector embeddings vec(x,y)—also referred herein as vector representations of symbol sequences SymSec(x,y) or simply as "vectors"—may be generated using any suitable model or combination of models, such as Word2Vec, GloVe, FastText, etc. The subsystem A 640 may use a plurality of neuron layers, such as an input layer, an output layer, and one or more hidden layers. The subsystem A 640 may be a recurrent neural network (RNN), a character-level RNN, a long short-term memory (LSTM) network, or any other similar network, including any combination of such networks. The subsystem A 640 may operate on an embeddings dictionary that may include vector representations of typical words found in the documents of the pertinent types. The subsystem A 640 may be trained to generate such vector representations of symbol sequences SymSeq(x,y) that have close numerical values vec(x,y) for the words that have close semantic meanings (e.g., "number" and "quantity") or that may be found in close proximity to each other (e.g. "amount" and "tendered"). The subsystem A 640 may be previously trained using training inputs 122 and training outputs 124, as described above. The documents used in the training phase—the training inputs 122 and training outputs 124—may be the documents of the same type as the target documents 140 (e.g., invoices, checks, purchasing orders, and so on) that are to be used during the prediction phase. Accordingly, while the dictionary for the vector embeddings SymSec(x,y) may be developed during the training phase for the specific class of target documents, the vector embeddings SymSec(x,y) need not belong to an embeddings dictionary pre-trained on some wider class of documents (e.g., books, newspapers, magazines) that are unrelated to the specific class of target documents. The first subsystem 640, having been trained, may be capable of predicting what symbol sequence SymSeq follows (or precedes, or is adjacent along a vertical or horizontal direction) a particular SymSeq. The predictions of the first subsystem 640 may come in the form of probabilities. For example, the trained subsystem A 640 may be able to predict that the word "amount" is preceded with the word "total" with 30% probability and is followed with the word "tendered" with 15% probability.

In some implementations, the output feature vector representations vec(x,y) may be independent of the specific location (x,y) of the symbol sequence SymSeq. More specifically, the coordinates (x,y) of the symbol sequence SymSeq(x,y) may serve as a geometric identifier of the sequence, but its vector representation vec(x,y) may be the same regardless of where in the image the sequence is located. For example, the subsystem A 640 may assign the same probabilities that various character sequences SymSeq (such as "city," "state") are found in the proximity of the word "street." In other implementations, the vector representations vec(x,y) of the same symbol sequence SymSeq may differ depending on the location of the sequence within the document (or within the image of the document 610). For example, the output of the subsystem A 640—the vector representations of a word, e.g., "escrow"—may vary depending on the location (x,y) of the word inside the image of the document 610. Accordingly, the vector representation of the word "escrow" may be closer (in the vector space) to representations of one set of words, if the word "escrow" is encountered in the middle of the document, but closer to representations of a different set of words, if the word escrow is found near the bottom of the document. The vector representations of a particular word may further depend on the type of the document. For example, the word "amount" may be represented differently in a real estate contract and in a purchasing order.

As a result, if M symbol sequences (characters, punctuation marks, words, sentences) are identified in the image of the document 610 and input into the subsystem A 640, the output of the first subsystem may be a set of M vectors (feature vectors) {vec(x,y)}. Each of the M vectors vec(x,y) may depend on the context of the whole document—the type of the document, the number of words in the document, the layout of text in the document, the locations of some or all words in the document, and so on.

The vector space for vectors vec(x,y) may have a number of dimensions N chosen based on the complexity of the document. In some implementations, N may be equal to 128 (32, 64, or any other number). The number N may be chosen to be greater to represent symbol sequences of a complex document and, conversely, smaller for simpler documents having limited dictionary of words. For a given number of dimensions N, each vector may have N components, vec(x, y)=$(z_1, z_2, \ldots z_N)$, wherein $z_j$ may be a binary number, a decimal number, or any other number accessible to a computer. In some implementations, some of the vectors vec(x, y) determined by the subsystem A 640—e.g., shorter words or punctuation marks—may have fewer than N numbers. In such implementations, the remaining components of the vector may be assigned zero vales, so that the overall length of all vectors may be the same.

The output of the subsystem A 640 may be schematically illustrated as a parallelepiped (cube) 650 composed of the components of individual vectors in the set {vec(x,y)}. Along the in-plane directions x and y, the area of the document image 610 may be discretized into p cells along the direction of x and s cells along the direction of y (e.g., p=32 and s=64, in one exemplary implementation). A word (character, sentence) centered over a particular cell (x,y) may have its vector representation vec(x,y)=$(z_1, z_2, \ldots z_N)$ visualized as a sequence of blocks (cells) stacked along the third direction, as shown schematically in FIG. 6 for a corner vector. Other vectors may be similarly stacked into other cells of the parallelepiped 650 herein referred as the "cube" even though it should be remembered that the number of cells along each of the three directions may be different from the number of cells along the other two, with s×p×N being the total number of cells in the "cube." To form the cube, the function Map (e.g., Gather) may be deployed.

The cube 650 having sxp xN cells containing a set {vec(x,y)} of M identified vectors corresponding to identified symbol sequences may be input to the subsystem B 260 for vector recalculation {vec(x,y)}→{VEC (x,y)} in view of the global context of the whole document. The subsystem B 660 may have one or more neural, which may modify the components of the vector representations vec(x,y) of the symbol sequences in view of all other vectors of the cube 650. As a result, the recalculated values VEC(x,y)=$(Z_1, Z_2, \ldots Z_{2N})$ may account for the context of the entire document. More specifically, the recalculated values VEC (x,y)=$(Z_1, Z_2, \ldots Z_{2N})$ output by the subsystem B 660 may account for the presence of all other symbol sequences in the document as well as the content of each of these symbol sequences.

The new cube 670 containing the set of the recalculated vectors {VEC(x,y)} may be input on the subsystem C 680 to predict a class of each symbol sequence identified in the document image 610. In some implementations, the field detection engine 111 can use the machine learning model(s) 114 to generate hypotheses about symbol sequences SymSeq of the document (represented with the set of vectors {VEC(x,y)}) belonging to various classes of the fields in the input document 140. The classes of the field may be "vendor name," "type of merchandise," "quantity of merchandise," "order number," "type of shipment," "place of delivery," "date of the order," "payment type," and so on. In some implementations, various classes of the fields may be predetermined for at least some of the document types and input into the third subsystem 680 as a set of external parameters. In other implementations, various classes that may be present in the document may be determined by the third subsystem 680, which may be trained to ascertain the type of the input document (e.g., "invoice," "order," "bill," etc.) and anticipate the classes of the fields that may likely be present in the determined type of the input document.

Some of the components illustrated in FIG. 6 may be combined. For example, subsystems A, B, and C may be realized as a single neural network, in one implementation. In some implementations, subsystems A and B may be realized as a single network while subsystem C may be realized as by a separate network. Similarly, in some implementations, subsystems B and C may be realized as a single network while subsystem A may be realized as by a separate network. In those implementations where multiple subsystems are realized by a combined single network, the functions of different subsystems in the combined network may be implemented by separate dedicated layers or by shared layers, or by some combination thereof.

Figure 7:
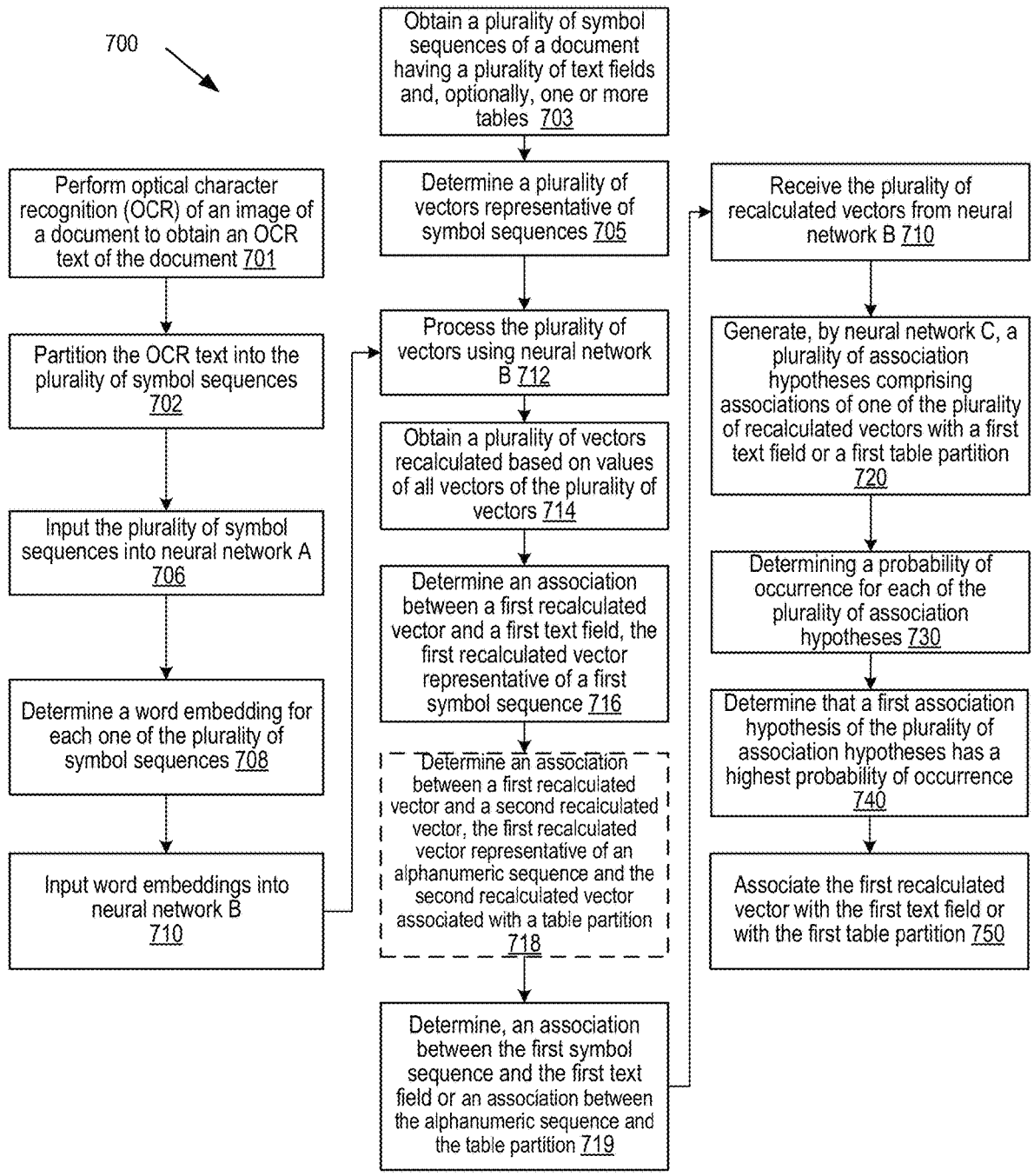
FIG. 7 is flow diagram illustrating one exemplary method that uses neural networks to determine vector representations for symbol sequences identified in an image of a document and to determine associations between symbol sequences and visual elements in a document, in accordance with some implementations of the present disclosure.

The deep training described above for system 600 can be implemented upon the fulfilment of a threshold criterion by method 700 described with reference to FIG. 7. As can be seen, FIG. 7 is flow diagram illustrating an exemplary methods 700 that uses a neural networks to account for the global document context in identification of visual elements such as fields and tables, in accordance with some implementations of the present disclosure. Method 700 may be performed by processing logic that may comprise hardware (e.g., circuitry, dedicated logic, programmable logic, microcode, etc.), software (such as instructions run on a processing device), firmware, or a combination thereof. In one implementation, method 700 may be performed by a processing device (e.g. a processing device 902 of FIG. 9) of a computing device 110 and/or a server machine 150 as described in connection with FIG. 1. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated descriptions list the operations of method 700 in certain order, various implementations of the method may perform at least some of the described operations in parallel and/or in arbitrary selected orders. In some implementations, the operations described in FIG. 7 may correspond to the functions discussed with reference to blocks 212 and 216 as well as to block 222 of FIG. 2

FIG. 7 is flow diagram illustrating one exemplary method 700 that uses neural networks to determine vector representations (e.g., word embeddings) for symbol sequences identified in an image of a document, in accordance with some implementations of the present disclosure. At block 710, the processing device (e.g., a computer) implementing method 700 may perform optical character recognition (OCR) of an image of a document to obtain an OCR text of the document 510. In some implementations, the document may have a plurality of text fields populated with alphanumeric symbol sequences. In some implementations, the document may also have at least one table having a plurality of partitions, such as cells, rows, and/or columns.

At block 720, the processing device performing method 700 may partition the OCR text into the plurality of symbol sequences SymSeq(x,y) of the document. Symbol sequences may be alphanumeric, graphic, or combined. Alphanumeric sequences may represent text (syllables, words, sentences), numbers, glyphs, and so on. Graphic sequences may represent table graphics elements, such as a horizontal line, a vertical line, an oblique line, a corner (a two-way line intersection that may be indicative of a corner table partition), a three-way line intersection (that may be indicative of an edge table partition), or a four-way line intersection (that may be indicative of an inside table partition). A combined sequence may be a combination of one or more alphanumeric symbols and one or more table graphics elements. A sequence may have a plurality of symbols, but may be a single symbol, in some instances.

At block 730, the processing device performing method 700 may input the plurality of symbol sequences into neural network A. The neural network A may be the subsystem A 640 described in relation to FIG. 6. The purpose of the neural network A may be to determine a plurality of vectors representative of the symbol sequences determined at block 720. In particular, at block 740, the neural network A may determine a word embedding for each one of the plurality of symbol sequences. The word embeddings may be vectors $vec(x,y)=(Z_1, Z_2, \ldots Z_N)$ corresponding to the identified symbol sequences SymSeq(x,y), as described above in relation to FIG. 6. The neural network A may be previously trained on input documents, which may be of a similar type to the target document.

The determined vectors (e.g., word embeddings) $vec(x,y)=(Z_1, Z_2, \ldots Z_N)$ may be input, at block 710, into the neural network B. The neural network B may be the subsystem B 660 described in relation to FIG. 6. The purpose of the neural network B may be to recalculate vectors $\{vec(x,y)\} \to \{VEC(x,y)\}$ taking into account a global context of the entire document. In some implementations the processing device performing method 700 can obtain the vector representations (i.e., embeddings) from elsewhere.

In one implementation the processing device performing method 700 can use neural networks to determine associations between symbol sequences and fields/tables of an document using the global document context, in accordance with some implementations of the present disclosure. For example, instead of performing the operations described with respect to blocks 701-710, at block 703, a processing device performing method 700 may obtain a plurality of symbol sequences of a document having a plurality of text fields and, optionally, one or more tables. In one implementation, operations performed at block 703 may be similar to operations performed at blocks 701 and 702. At block 705, the processing device may determine a plurality of vectors vec(x,y) representative of symbol sequences. In one implementation, operations performed at block 705 may be similar to operations performed at blocks 706 and 708.

In either case, after either block 710 or block 705, the processing device performing method 700 may, at block 712, continue with processing the plurality of vectors {vec(x,y)} using neural network B. The output of the neural network B may be a plurality of vectors, $\{vec(x,y)\} \to \{VEC(x,y)\}$, recalculated, at block 714, based on values of all or some of the vectors of the plurality of vectors. To obtain the plurality of recalculated vectors, the processing device performing method 700 may use a horizontal-pass network and/or a vertical-pass network. The outputs of the networks may be concatenated and the set of recalculated vectors {VEC(x,y)} may be determined from the concatenated results, as described above.

At block 716, the processing device performing method 700 may continue with determining an association between a first recalculated vector and a first text field, the first recalculated vector being representative of a first symbol sequence. For example, a text field "Total" may be associated with a recalculated vector that corresponds to an amount listed in an invoice document. Operations of an optional block 718 may be performed by the processing device performing method 700 in those instances where the document contains at least one table. Specifically, at block 718, the processing device performing method 700 may determine an association between a first recalculated vector and a second recalculated vector, the first recalculated vector representative of an alphanumeric sequence and the second recalculated vector associated with a table partition, such as a cell, a row, or a column. In some implementations, the first recalculated vector of block 718 may be the same as the first recalculated vector of block 716. For example, the first recalculated vector representative of the amount (alphanumeric sequence) and associated with the field "Total" at block 716 may also be determined, at block 718, to be associated with a table partition (e.g., the last row or cell of the table) represented by the second recalculated vector. In some implementations, however, the first recalculated vector of block 718 may be different from the first recalculated vector of block 716. At block 719, the processing device performing method 700 may continue with determining an association between the first symbol sequence and the first text field or (when at least one table is present) an association between the alphanumeric sequence and the table partition.

Thereafter, the processing device performing method 700 can use neural networks to generate and test a plurality of hypotheses of associations between symbol sequences and visual elements (e.g., fields/tables) of a document, in accordance with some implementations of the present disclosure. For example, at block 710 the method 700 may receive the plurality of recalculated vectors {VEC(x,y)} from the neural network B. At block 720, the processing device performing method 700 may generate, by a neural network C, a plurality of association hypotheses comprising associations of one of the plurality of recalculated vectors with a first text field or with a table partition. In some implementations, the neural network C may be the subsystem C 680 of FIG. 6. For example, a hypothesis may be that an n-th vector representing the alphanumeric sequence "$128" is associated with a field "amount tendered" that is known to be present (or may be present, with some probability) in the document. As another illustrative example, a hypothesis may be that an m-th vector representing the alphanumeric sequence "total" is associated with the rightmost cell in the first row of a table that may be present in the document.

At block 730, the processing device performing method 700 may continue with determining a probability of occurrence for each of the plurality of association hypotheses. This may be performed using one or more neural layers of the network C by utilizing a testing function, in one implementation. The testing function may be determined based on evaluation of training inputs (e.g., training inputs 122) and comparing the outputs of the network C with the training outputs 124 and tuning parameters of the testing function to minimize the difference between the current outputs and the training outputs.

At block 740, it may be determined, by the processing device performing method 700, that a first association hypothesis of the plurality of association hypotheses has a highest probability of occurrence. For example, the first association hypothesis may include an association of the first recalculated vector with the second recalculated vector. The highest probability may refer to an association of a given symbol sequence with a particular field or with a particular table partition, in one possible implementation. In other words, the hypotheses may be grouped by symbol sequences (e.g., all possible hypotheses of association of the symbol sequence "$128" with various fields may be grouped together). Accordingly, within a given group, a plurality of hypotheses of possible associations of a specific symbol sequence with various fields/table partitions may be analyzed and the highest probability hypothesis may be selected. In another possible implementation, the hypotheses may be grouped by fields or by table partitions. For example, all possible hypotheses of association a table cell (2,4)—e.g., a cell in the fourth column of the second row—with various alphanumeric sequences may be grouped together and the highest probability hypothesis of association of the cell (2,4) may be selected. At block 750, the processing device performing method 700 may continue with the processing device selecting the highest probability hypothesis and associating the first recalculated vector with the first text field or with the first table partition. In this manner, using a more extensive (relative to the method described in connection with FIGS. 3-4) set of documents 140 obtained externally or from the library 160 in repository 120, the system can perform deep training to teach the models to detect/extract visual elements from documents 140.

Figure 8:
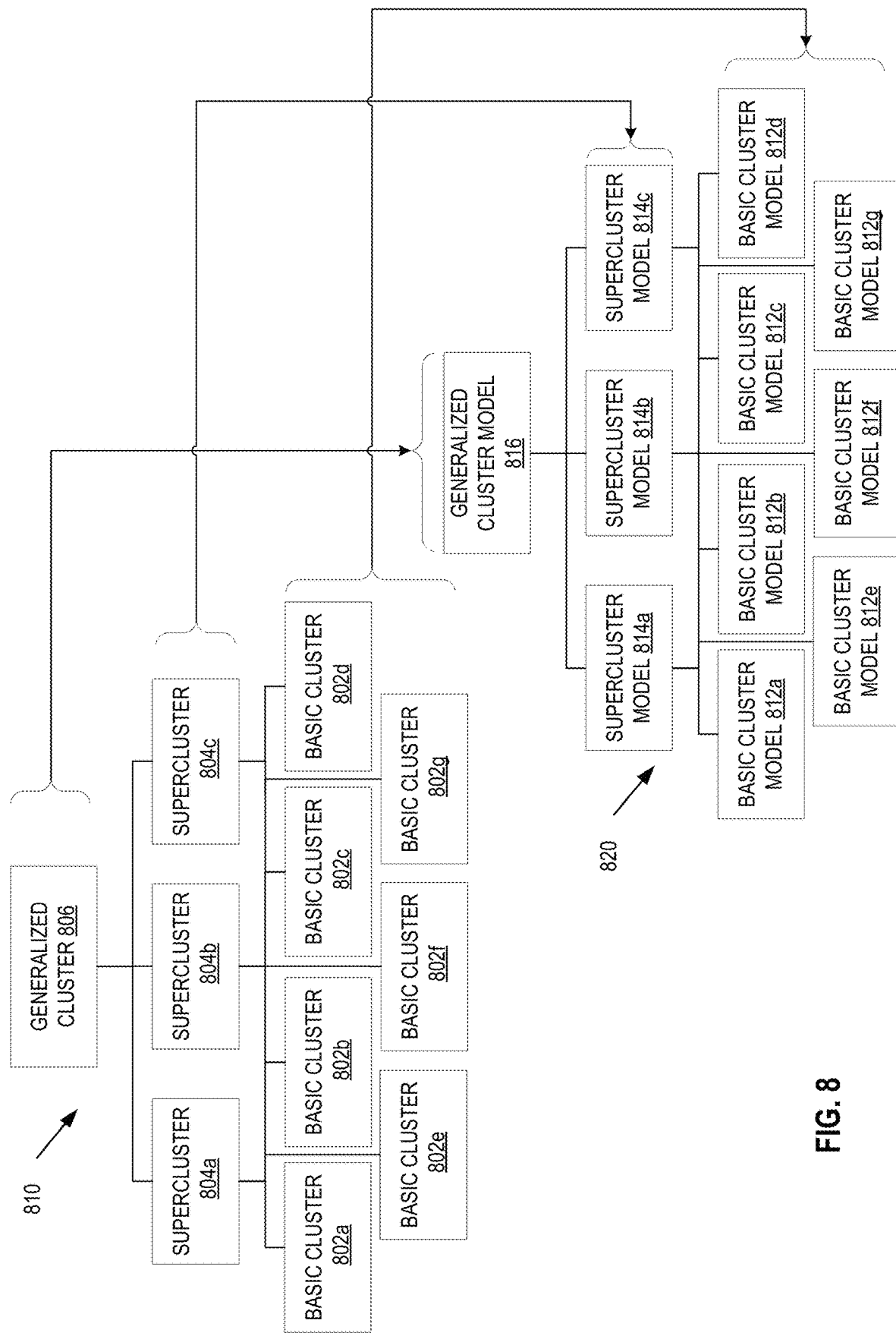
FIG. 8 is a block diagram depicting an example hierarchy of clusters and a corresponding exemplary hierarchy of machine learning models, in accordance with some implementations of the present disclosure.

FIG. 8 shows a block diagram depicting an example hierarchy of clusters and a corresponding exemplary hierarchy of machine learning models described earlier in connection with FIGS. 1-2. As can be seen, clusters of documents can be visualized as a hierarchical tree 810 of iteratively larger clusters of multiple levels. For example the bottommost level of the hierarchical tree can be made up of basic clusters 802*a-g*. Each of the basic clusters 802*a-g* can include small sets of documents 140 that share an attribute in common and are generated according to the methods described in connection with FIGS. 2-4. Accordingly, each basic cluster can include a collection of documents 140.

Some or all of the basic clusters can further be grouped into superclusters 804*a-c*. Each of the superclusters 804*a-c* can include one or more of the basic clusters 802*a-g* that include documents sharing an attribute or having an attribute in common. Further, a combination of superclusters of documents can form a generalized cluster 806 that can include most or all the documents of the superclusters 804 and basic clusters 802. The generalized cluster can serve as a complete collection of the documents used to train machine learning models in accordance with the present disclosure. However, each cluster that is smaller than the generalized cluster (i.e., superclusters and basic clusters) can serve as a basis for training a machine learning model.

Accordingly, hierarchical model tree 820 includes the machine learning models which correspond to (i.e., are trained using) the respective clusters of hierarchical tree 810. Thus, each of basic clusters 802*a-g* can respectively be used to train basic cluster models 812*a-g* to detect/extract visual elements from documents 140 via the methods described herein (e.g., via fast training). Analogously, supercluster models 814*a-c* correspond to respective superclusters 804*a-c* on the basis of which supercluster models 814*a-c* can be trained to detect/extract visual elements from documents 140 via the methods described herein (e.g., via deep training). Lastly, as noted above, generalized cluster model 816 corresponds to generalized cluster 806 on the basis of which the generalized cluster model 816 can be trained to detect/extract visual elements from documents 140 using the methods described herein.

In some implementations of the present invention documents are input into the system and are classified using, for example, a pre-trained classifier/clusterizer. Documents with a predetermined measure of similarity can be assigned to corresponding respective clusters. These can be, for example, documents from the same vendor or documents with a similar layout. After classification/clusterization, a user can mark up a small number of documents (e.g. 2-3). After the markup is performed the system can automatically create a cluster for the documents and initiate training of a machine learning model for processing documents (e.g., a model for extracting visual elements such as fields or tables).

In some implementations, a user can independently mark up fields on a set of 3-5 previously classified documents of each type from which the user would like to detect and extract information (e.g., information contained in the fields of the document). These marked documents can be received by or uploaded to a component of the system preferably in an automated manner. Thereafter, the set of documents can be automatically broken up into clusters in accordance to the respective similarity of the documents to each other (e.g., by the name of the vendor, the language, the country of origin, the layout, or other attributes of the documents).

Thereafter, the selection of words can be performed. The given operation divides the text of each document into continuous subsequences of symbols that belong to a single type. Then, the document can undergo the classification of field components whereby each word of the document can be classified based on the possibility of its inclusion in a particular field. After that, the classification of component links can be performed whereby for each pair of components, a measure of their mutual inclusion in a specified field of the document is calculated. At this point, the system can output a collection of potential hypotheses for the respective fields of the document. These hypotheses can be filtered and evaluated. For the filtration and evaluation of the hypotheses, additional attributes or properties of the fields can be used. For example, user parameters such as the maximum and minimum sizes of fields set by the user can be provided to the system. Alternatively, the parameters can be determined automatically by the system itself. For example, an example of such automatically set parameters can be geometric parameters of the fields and threshold values that are determined by heuristic methods. Once the hypotheses are obtained and filtered, an evaluation of the hypothesis quality and an analysis of the results can be performed. Thereafter, the system can detect and classify fields in accordance with the results received from the analysis and in accordance with to the selected hypotheses having the highest accuracy.

The process of using the trained machine learning models can be logically divided into two stages. The first stage is the localization of fields. The localization of fields can refer to the prediction of the region where the fields are located. The second stage is the search and collection of fields within the localized regions and the generation, analysis, and improvement of their respective hypotheses. After this, the best hypotheses can be selected and further perfected in quality using BPE tokens.

For each cluster in the system, several types of trainings may be available. There may be different types of trainings relating to the detection and extraction the fields, to the detection and extraction of tables, and to the detection and extraction of other visual elements available for the models. Each of the fast training methods and the deep training methods described above may be used by the system to train the models.

For example, when a new document is received, a clusterization model can be initiated to determine which cluster the document should be assigned to. Alternatively, a vendor detector can serve as a clusterization model and perform the subsequent subdivision of the documents into groups based on their respective vendors. In another implementation an adaptive customizable clusterization model such as those described herein above in connection with FIG. 5 can be used.

Thus, if a document is assigned to a cluster for which there already is a document processing machine learning model, the corresponding model can be initiated for the extraction of information. However, if the document is assigned to a cluster which does not yet contain a sufficient number of documents for the training of a model, the document can be marked up manually or by another automatic system that can be corrected by manual markup. Further, if a cluster to which the document can be assigned is not found, a new cluster can be generated and the document can be assigned to the new cluster. Thereafter, the document can be marked up in a manner analogous to the one described earlier.

As the system continues to work, marked-up documents may continue to dynamically accumulate. Accordingly, the number of clusters will also increase dynamically. As the number of document in each cluster increases, the existing model corresponding to each cluster can be retrained or additionally trained on an ever-increasing number of documents. In this manner, the quality of document processing can improve through the improvement of visual element detection and information extraction.

Upon the satisfaction of a predetermined threshold condition (e.g., the accumulation of 300 to 500 clusters [based on vendors] each containing 10 to 20 documents) the system can initiate the different type of training for neural network models. Neural network models can extract visual elements such tables and non-table elements such as fields from a document. Neural network models used in connection with deep training can be generalized one unlike the fast training models trained on the clusters generated form the small sets of documents as previously described (e.g. basic clusters). The generalized models eliminate the need for the user to manually enter or markup elements for new document layouts for which a cluster was not found. The deep training of neural network models as described above in connection with FIGS. 6 and 7.

The general stages of the operation of neural network models can be understood as follows: Stage 1 is the receipt and OCR of a document; stage 2 is the generation of feature vectors for the machine learning model; stage 3 is the use of a recurrent sub-net on the generated feature vectors to obtain vector representations for each word in the document; stage 4 is the generations of hypotheses for the association of each word to a given field; stage 5 is the selection and the generation of the set of words associated with the field; stage 6 is the identification and extraction of the field associated with the set of words related to the field.

Considering that a given neural network model corresponds to a particular cluster, then the overall aggregation of cluster based neural network models forms a tree-like structure 820 that is created as documents are processed by the system. At the top-most level is the generalized cluster model 816 that is capable of processing a document of any random layout with a stable average quality of accuracy. After the top-most level, follows a second level for more specialized neural network models 814, trained on superclusters 804 (e.g., clusters of documents grouped by country of origin or language as opposed to basic clusters grouped by vendor). For example, a supercluster can include a group of all the documents written in one language. In another implementation, a supercluster can refer to the group of all documents with a similar layout. In another example, a supercluster can be the collection of documents in various documents but of the same type (e.g., invoices). In some implementations, a user can generate a supercluster manually.

After the second level follows a level of quick specialized trained models 812 trained via the fast training methods described above based on basic clusters 802. Their accuracy and quality of operation may be significantly higher for very similar documents or documents from the same vendor. Accordingly these models 812 can be used to perfect and improve the aforementioned models 814, 816 that were respectively trained on the superclusters 804 and the generalized cluster 806.

Prior to training a particular model with the deep training approach, the following sequence of steps can be followed. In some implementations, first a generalized neural network model (e.g., one that is pre-trained by a developer) is initiated. It is assumed that such a model is capable of operating on all types of documents at a stable average performance quality. Then a specialized neural network model (e.g., one that is pre-trained by a developer) is initiated. The more specialized neural network model can be understood to work on a particular type of documents (e.g., an invoice in English, any invoice, or any document in English, etc.). Then, a neural network model trained on user documents (i.e., basic clusters) (assuming a sufficient number of documents has been accumulated for training the neural network) is initiated. The neural network is trained on a supercluster.

In some implementations a model trained on the basic cluster nearest (i.e., most similar in accordance with method 500) to the input document is initiated if the input cannot be assigned to a basic cluster to which it belongs. If the document is assigned to a basic cluster, then the model trained on the corresponding basic cluster is initiated. Thus, it is assumed that a model trained on a "neighboring" cluster can be used for documents for which do not have a corresponding trained model while still maintaining a level of quality.

In one example, a user may need to detect the "Total" field on a variety of different document types. In this case, a model trained for invoices and another type of document can be used for this set of documents to detect the desired field. In another example, documents of a standardized form with the same nomenclature for their respective fields but having the form of their fields vary depending on the year of the document (e.g., tax statements, applications) can be presented. In this example, a model trained on a nearby cluster can also be initiated for visual element detection and/or extraction.

As a result of operating on a nearby cluster, the system can select confident and not confident fields for the user and indicate them with different colors on the interface of the system. Further, the user can validate the obtained results and evaluate the quality of the results of the model's operation. At the last stage of the system's operation a mechanism of post-processing the extracted information may be implemented. The post-processing mechanism can select the hypotheses with the highest quality (i.e., accuracy/precision of visual element detection/extraction).

The evaluator of the hypotheses can evaluate the group of hypotheses of semantically linked fields and the quality of such a group of hypotheses. As explained in connection with FIG. 4 earlier, in selecting one or more hypotheses with a maximum quality, the semantic relationship between the hypothesis fields and the absolute location of the fields relative to the document can be taken into consideration.

Further, in some implementations, after postprocessing by the system, a manual validation can be implemented if necessary and the entire sequence can be repeated. For example, manual validation can be implemented if the results of the postprocessing by the system are not satisfactory.

In this manner a self-trainable system for document processing is presented. The participation of a user is only required initially for marking up only a small set of new types of documents or for validating/correcting markup that was automatically generated by the system. Thereafter a user may be involved in validating results or resolving borderline cases where the system cannot provide a confident result.

In one implementation the trained models may not need to contain the information of the documents. In this manner the models can be reused by different users or between companies without the risk of the disclosure of any documents to third-parties. FIG. 10 illustrates a high level flow diagram of an example method 1000 for "depersonalization of documents" and obtaining features from them on which neural networks can be trained, in accordance with some implementations of the present disclosure. As used herein, "depersonalization" may refer to the anonymization of the documents and/or the information contained therein. Method 1000 may be performed by processing logic that may comprise hardware (e.g., circuitry, dedicated logic, programmable logic, microcode, etc.), software (such as instructions run on a processing device), firmware, or a combination thereof. In one implementation, method 1000 may be performed by a processing device (e.g. a processing device 902 of FIG. 9) of a computing device 110 and/or a server machine 150 as described in connection with FIG. 1. In certain implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other. Therefore, while FIG. 10 and the associated descriptions list the operations of method 1000 in certain order, various implementations of the method may perform at least some of the described operations in parallel and/or in arbitrary selected orders.

A processing device performing method 1000 can receive sets of documents. At block 1002 the documents can undergo OCR. After the OCR process the resulting output can include sequences of words along with the coordinates (x,y) of each word on the plane of the document. Each word can be a sequence of one or more symbols including numbers, letters, and punctuation marks as well as combinations thereof. Accordingly, at block 1004, the word can be divided into its constituent symbols (relative to the document).

As used herein, the term "Word1" shall refer to a selection of one or more hash-codes of the aforementioned symbols comprising the words the utilization is described in more detail below. Then, at block 1010, a multistage irretrievable coding of symbols is performed to obtain abstract features. This operation is described in more detail with reference to blocks 1011-1017. At block 1011, Unicode values for the symbols obtained in block 1004 are determined as they will be used in the subsequent stages of the process. It should be understood that, although the discussion of one of the implementations of the present disclosure focuses on Unicode representations of the symbols, other coded representations (encoding) of the symbols such as, for example, Unicode Transformation Format (UTF) and American Standard Code for Information Interchange (ASCII) can be used without departing from the scope contemplated herein. Further, at block 1011, a table containing the Unicode values of all of the symbols of the document as entries can be created. The table can be generated with entries including a Unicode value of each symbol along with its respective coordinates on the document.

Afterwards, at block 1013, a first hash function can be applied to the table of the Unicode values of the aforementioned symbols. The application of the hash function can form a part of the application of universal hashing whereby a hash function is selected at random from a family of hash functions with a particular mathematical property (e.g., to reduce the number of or to eliminate collisions of outputs of the hashing operation). For example, a hash function may be: hash=128+(symbol code) mod (128) where "mod" refers to the modulo operation in the form of a mod n, which given two positive numbers a and n, provides the remainder of the Euclidean division of a by n, where a is the dividend and n is the divisor. Thus, since each Word1 is a sequence of the hashed-codes of each of the symbols comprising a given word, the length of a Word1 depends on the length of the word to which it corresponds. Accordingly, after the hashing operation is performed in block 1013, each entry in the table can include concatenated hashed values of the respective Unicodes of each of the symbols along with their respective coordinates.

In this manner, after the application of the hash function, at block 1013, a second table (i.e., an array) of hashed symbol values, is generated. The second table can be of a smaller size than the first table due to the reduction of the sizes (compression) of entries due to the hashing and further due to collisions of outputs (i.e., when different input values result in an identical value after hashing). Then, at block 2014, each of the obtained hash values for each of the Unicode values of each of the symbols can be transformed into a vector of real numbers (i.e., a one dimensional array) for each word by using a second hash function that is different from the first function. The given second hash function is formulated in such a manner so as to generate values that are suitable for the training of neural networks. The results of the second hash function can be analogous to the word embeddings described earlier derived from a sequence of hashes in the sense that they can serve as a mapping from a discrete word to a vector of real numbers. When generating the vector of real numbers, features such as the length of the word, similarity of one word to another, the geometric location of the word relative to the plane of the document, the location of the word relative to other words, etc. can be taken into consideration by having respective values associated with respective features being appended to the vector representations. Thereafter, an array (matrix) of the vectors of Word1s comprised of the outputs of the second hashing function (i.e., Unicode values that have been hashed with the first hash function and the second function) can be created.

Afterwards, using the matrix of the vectors a neural network model can be trained at block 1015 by transforming the values of the matrix. To do this, a linear transformation is performed (i.e., one vector space is transformed into another vector space) and each of the values prior to and after the transformation are recorded (i.e., each value of the encoded symbol is associated with the corresponding value obtained after the transformation). Then, at block 1016, irreversible non-linear activation functions are applied to a model/matrix with the context being accounted for. For example, an activation functions such as new_value=MAX (0, value) will return an output of 0 if given an input of any negative number. Accordingly, if it is known that the output is 0 it is impossible to determine the exact initial input value. In this manner, the non-linearity functions as a guarantee of the irreversibility of the transformation and operates in only one direction. The subsequent transformations or operations acting on the values all take place in an abstract space.

The obtained abstract values are sufficient to train a neural network to detect and extract fields from a document. The obtained abstract values are implicitly linked to the context of the symbols (e.g., the location of a symbol relative to a field, relative to the document, or relative to the surroundings of the symbol). A neural network can detect these implicit relationships and can be trained on the respective correlations associated therewith.

The trained model of the system includes an encoder and an implicit transformation module (i.e., a module that is analogous to a decoder cannot be used to recover the original symbols). The implicit transformation module implicitly transforms (i.e., decodes without obtaining the original input) the coded values into other values for the purpose of subsequently training the encoder. Overall, the system performing the method 1000 of depersonalization (i.e., abstracting of values and anonymization of the information) can be described as a system of the "encoder-decoder" type. In this context, the "decoder" is implicit in the sense that the implicit transformation module only serves for the purpose of training the encoder and is not used in the operation of the trained system. The decoding/transformation is implicit in the sense that the original symbol values (e.g., Unicodes of each symbol) cannot be recovered through the use of the module. The implicit transformation module does not permit the recovery of the initial values of the "words" (i.e., the Unicode values) or even of their hashed values obtained after the application of the second hash function. Accordingly, the implicit transformation module is used only while the encoder is being trained. The implicit transformation module cannot, even in principle, recover the initial values from which the final hashed values were obtained.

Thus, in contrast with explicit transformation/decoding where the initial input values can be recovered, the embodiment described operates in such a manner that the initial values cannot be recovered even in the process of training the encoder. Accordingly, the information that was initially provided (e.g., from a document) is depersonalized (i.e., anonymized) to the point of impossibility of recovery. However, the depersonalized information can still be used to train neural network models for detection and extraction of other information from other documents.

In one implementation, the system receive several vectors of real numbers of a particular size (wherein any incomplete element is filled with a 0) corresponding to respective Word1s made up of respective hashed symbol codes (e.g., a collection of 1024 Word1s). Each word can comprise, for example, 32 hashes of symbols. As indicated earlier, Word1 refers to a collection of doubly hashed symbol codes (e.g., Unicode values that have been sequentially subjected to two different hash functions the second of which was an irreversible hash function). If Word1 is shorter than the predetermined value (e.g., 32 or another value), then the "remainder" is filled in with zeroes in the vector of numbers.

The encoder encodes each Word1 into a vector of numbers of a predetermined size (e.g., 128 numbers). At the output of the encoding, a number of vectors is obtained that is equal to the number of Word1s (e.g., 1024 Word1s are encoded into 1024 vectors of equal length although the numbers may be different).

In some implementations, the aforementioned neural network model has three output modules, (i) an implicit transformation module, (ii) a distance determination module, and (iii) a prediction training module. The implicit transformation module learns to recover the input "word" albeit inaccurately. In this manner both augmentation and variation is simultaneously performed (i.e., the model is trained to associate different Word1s to the same 128 numeral value code as if the Word1s are mistakes).

For example, in an implementation using an autoencoder type neural network (e.g., a neural network wherein one or more layers including the input layer form an encoder, one of the hidden layers in the center contains values representing codes of the inputs, and one or more layers including the input layer form a decoder) the input layer may receive words and augmented words (i.e., intentionally incorrectly formed words containing errors, spaces, omissions, modifications etc.), generate codes for the inputs in a hidden layer, and output words at an output layer that attempts to match them with a set of training data. Accordingly, the neural network can be trained to match each input word and augmented word to a particular corresponding code at the central hidden layer. The input words are only used to train the encoder portion to match the words with corresponding codes (from which it is impossible to recover the initial input value/word). However, when the implicit transformation module is being trained, it is not the original input words that are being used, but rather the codes (i.e., Word1s containing the doubly hashed Unicode values of the symbols of the words) from which the original words cannot be recovered. So, since input words (i.e., the Unicode values of their constituent symbols) are hashed twice and then subjected to irreversible non-linear transformation it is impossible to recover the original word from a corresponding code due to a lack of one-to-one correspondence between inputs and outputs at each hashing and transformation step.

The trainable distance determination module "Dist" which learns to predict the difference between two Word1s. This module learns to predict the edit distance (e.g., the number of mistakes/changes) one Word1 is different from another Word1 (i.e. determining the minimum number of operations to change one Word1 into the other). For example, this module can have an output layer that can be trained to predict the real edit distance. Given a code and a word to which the code can potentially correspond, the distance determination module can determine an edit distance between the code and the word with a certain level of likelihood. For example, the edit distance determination module can determine that for a particular code the edit distance between the code and the string "1021291029102" is 0.85 and also determine that the edit distance between the code and the string "axbycz" is also 0.85 indicating a certain level of similarity between the strings without being able to determine whether the strings correspond to identical words. The prediction training module which learns to predict the length of the original Word1 based on the encoded vector using various neural network model training techniques.

Thus, a trained encoder can encode all the words of a document into numerical vectors without the possibility of precise recovery of the original words. However, these encodings, which reflect the size as well as certain other features of the original word, are sufficient to train neural networks to extract information from documents. The encodings are formulated such that it would be possible to determine approximately (but not precisely) how different the original Word1s are from each other based on their respective encodings.

One example of a trainable distance determination module—EditDistance("Zina", "Dima")=2 (i.e., two corrections/modifications are needed to transform the first word into the second. The operations may be as follows: the encoder may encode the word Zina into a first vector as described by Encoder(«Zina»)=[2.1, 3.5, 4.2, . . . , −3.3, 0.9]=Vec_1; the encoder can also encode the word Dima into a second vector Encoder(«Dima»)=[1.4, −0.5, 2.8, . . . , 1.7, −2.1]=Vec_2. The length of the first vector can be approximated by L(Vec_1)=4.24 (approximately 4 letters, maybe 5) and the length of the second vector can be approximated by L(Vec_2)=3.81 (approximately 3 or 4 letters); thereafter the edit distance between them can be obtained by Dist(Vec_1−Vec_2)=2.51 (maybe 2, or maybe 3). Notably, this result is obtained without reference to or recovery of the original words Zina and Dima.

Having obtained depersonalized and anonymized feature vectors, the values can be used for model training to detect and extract visual elements such as tables and fields form various documents. The feature vectors (i.e., embeddings) can be used in the methods described in connection with FIGS. 6-7 described earlier.

Figure 9:
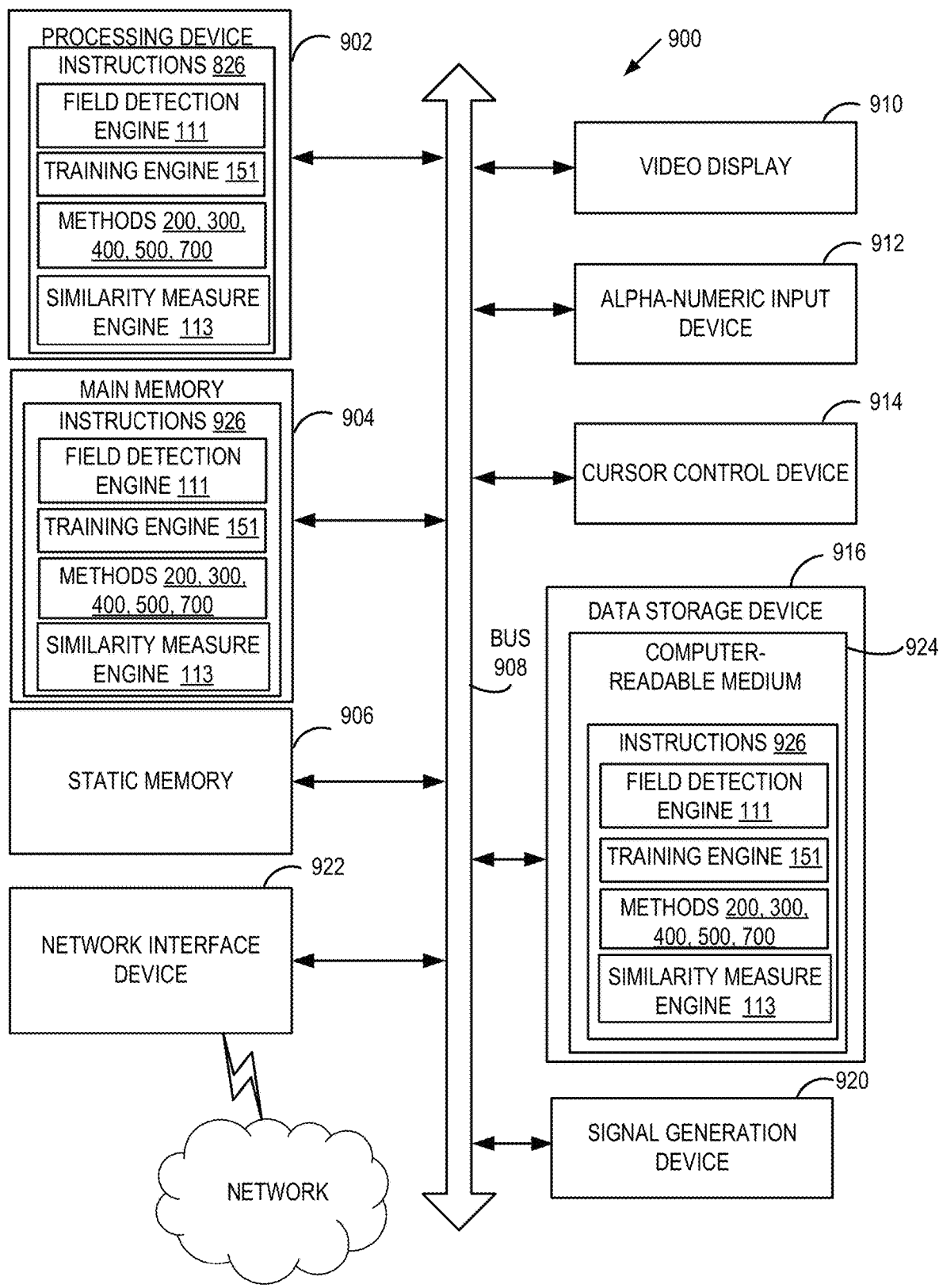
FIG. 9 illustrates a block diagram of a computer system in accordance with some implementations of the present disclosure.
Figure 10:
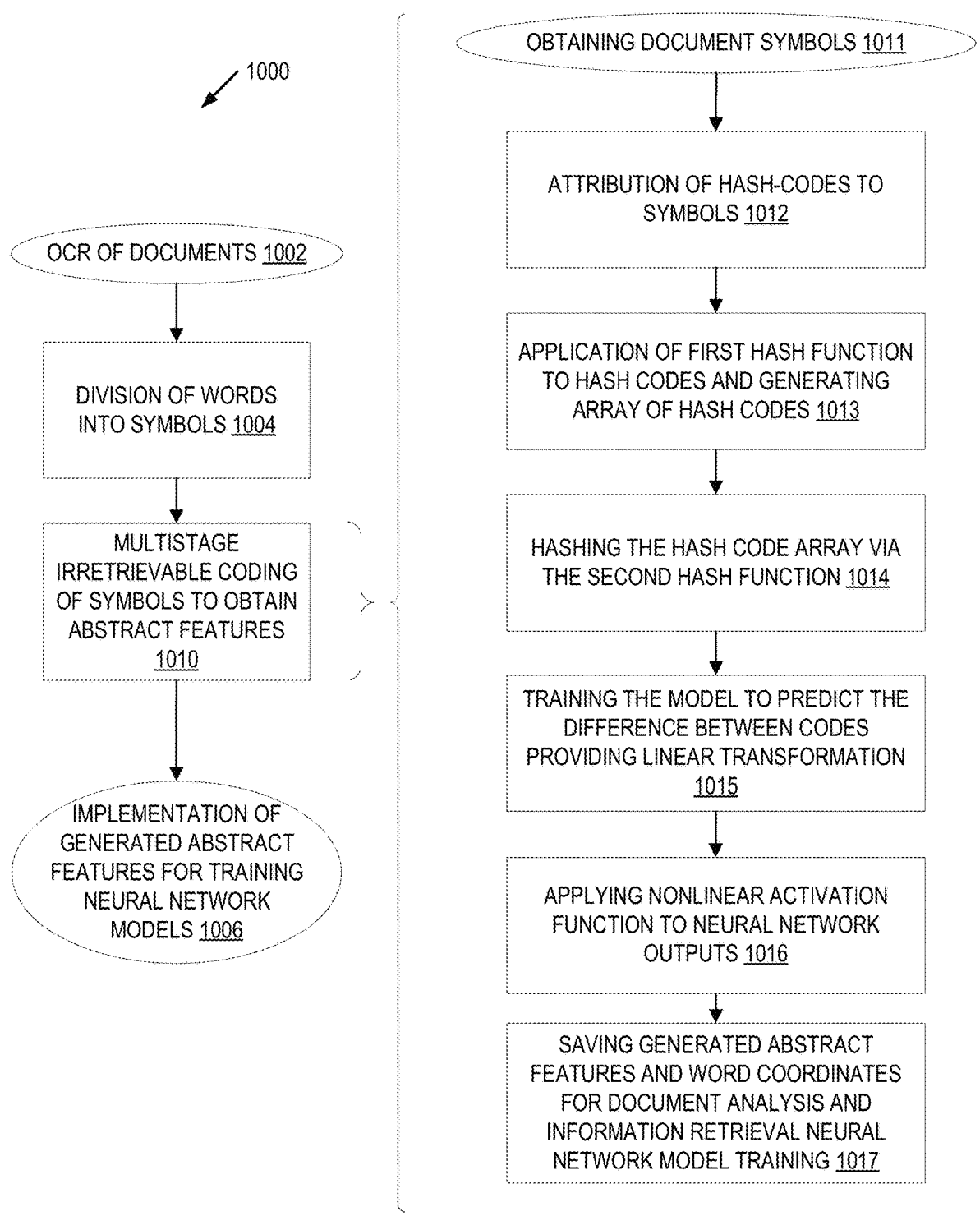
FIG. 10 illustrates a high level flow diagram of an example method for depersonalization of documents, in accordance with some implementations of the present disclosure.

FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for implementing the various subcomponents/modules described herein, such as the _____, the field detection engine 111, training engine 151, table detection engine 112, and/or the similarity measure determination engine 113 of FIG. 1 and to perform the operations discussed herein (e.g., operations of methods 200, 300, 500, 700, and 1000 respectively of FIGS. 2-3, 5, 7, and 10).

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker). In one illustrative example, the video display unit 910, the alphanumeric input device 912, and the cursor control device 914 may be combined into a single component or device (e.g., an LCD touch screen).

The data storage device 916 may include a computer-readable medium 924 on which is stored the instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable media. In some implementations, the instructions 926 may further be transmitted or received over a network via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   receiving, by a processing device, one or more documents;
   performing optical character recognition on the one or more documents to detect words comprising symbols in the one or more documents;
   determining an encoding value for each of the symbols;
   applying a first hash function to each encoding value to generate a first set of hashed symbol values;
   applying a second hash function to each hashed symbol value of the first set of hashed symbol values to generate a vector array comprising a second set of hashed symbol values;
   applying a linear transformation to each value of the second set of hashed symbol values of the vector array;
   applying an irreversible non-linear activation function to the vector array to obtain abstract values associated with the symbols; and
   saving the abstract values to train a neural network to detect fields in an input document.

2. The method of claim 1, further comprising training a neural network to detect fields in the input document using the saved abstract values.

3. The method of claim 1, wherein the encoding value is a Unicode value.

4. The method of claim 1, wherein the first hash function is a summation of a whole number and a remainder of a division of the encoding value and the whole number.

5. The method of claim 1, wherein the vector array encodes information associated with features of the words.

6. The method of claim 1, wherein the second hash function is different from the first hash function.

7. The method of claim 1, wherein the first hash function is a universal hash function.

8. A system comprising:
a memory;
a processor coupled to the memory, the processor configured to:
- receive one or more documents;
- perform optical character recognition on the one or more documents to detect words comprising symbols in the one or more documents;
- determine a encoding value for each of the symbols;
- apply a first hash function to each encoding value to generate a first set of hashed symbol values;
- apply a second hash function to each hashed symbol value of the first set of hashed symbol values to generate a vector array comprising a second set of hashed symbol values;
- apply a linear transformation to each value of the second set of hashed symbol values of the vector array;
- apply an irreversible non-linear activation function to the vector array to obtain abstract values associated with the symbols; and
- save, to the memory, the abstract values to train a neural network to detect fields in an input document.

9. The system of claim 8, wherein the processor is further configured to train a neural network to detect fields in the input document using the saved abstract values.

10. The system of claim 8, wherein the encoding value is a Unicode value.

11. The system of claim 8, wherein the first hash function is a summation of a whole number and a remainder of a division of the encoding value and the whole number.

12. The system of claim 8, wherein the vector array encodes information associated with features of the words.

13. The system of claim 8, wherein the second hash function is different from the first hash function.

14. The system of claim 8, wherein the first hash function is a universal hash function.

15. A non-transitory machine-readable storage medium including instructions that, when accessed by a processing device, cause the processing device to:
- receive one or more documents;
- perform optical character recognition on the one or more documents to detect words comprising symbols in the one or more documents;
- determine a encoding value for each of the symbols;
- apply a first hash function to each encoding value to generate a first set of hashed symbol values;
- apply a second hash function to each hashed symbol value of the first set of hashed symbol values to generate a vector array comprising a second set of hashed symbol values;
- apply a linear transformation to each value of the second set of hashed symbol values of the vector array;
- apply an irreversible non-linear activation function to the vector array to obtain abstract values associated with the symbols; and
- save, to a memory, the abstract values to train a neural network to detect fields in an input document.

16. The non-transitory machine-readable storage medium of claim 15, wherein the instructions further cause the processing device to train a neural network to detect fields in the input document using the saved abstract values.

17. The non-transitory machine-readable storage medium of claim 15, wherein the encoding value is a Unicode value.

18. The non-transitory machine-readable storage medium of claim 15, wherein the first hash function is a summation of a whole number and a remainder of a division of the encoding value and the whole number.

19. The non-transitory machine-readable storage medium of claim 15, wherein the vector array encodes information associated with features of the words.

20. The non-transitory machine-readable storage medium of claim 15, wherein the second hash function is different from the first hash function.

* * * * *